US012360649B2

(12) United States Patent
Heikkinen et al.

(10) Patent No.: US 12,360,649 B2
(45) Date of Patent: Jul. 15, 2025

(54) CONTEXT CARDS FOR MEDIA SUPPLEMENTATION

(71) Applicant: Snap Inc., Santa Monica, CA (US)

(72) Inventors: Christie Marie Heikkinen, Sherman Oaks, CA (US); David Phillip Taitz, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/407,639

(22) Filed: Jan. 9, 2024

(65) Prior Publication Data

US 2024/0143124 A1     May 2, 2024

Related U.S. Application Data

(63) Continuation of application No. 18/320,691, filed on May 19, 2023, now Pat. No. 11,893,204.

(Continued)

(51) Int. Cl.
*G06F 3/0481*     (2022.01)
*G06F 3/0484*     (2022.01)
(Continued)

(52) U.S. Cl.
CPC .......... *G06F 3/0481* (2013.01); *G06F 3/0484* (2013.01); *G06T 11/60* (2013.01); *G06F 3/165* (2013.01); *G06T 2200/24* (2013.01)

(58) Field of Classification Search
None
See application file for complete search history.

(56) References Cited

U.S. PATENT DOCUMENTS 10,348,970 B2 *   7/2019   Kang ................... H04N 23/698
10,891,013 B2     1/2021   Miura et al.
(Continued)

FOREIGN PATENT DOCUMENTS

| CN | 119278428 | 1/2025 |
| KR | 20220062660 | 5/2022 |
| WO | 2023229932 | 11/2023 |

OTHER PUBLICATIONS

"International Application Serial No. PCT/US2023/022898, International Search Report mailed Sep. 13, 2023", 6 pgs.

(Continued)

*Primary Examiner* — Toan H Vu
(74) *Attorney, Agent, or Firm* — Schwegman Lundberg & Woessner, P.A.

(57) ABSTRACT

In some examples, a method to present an affordance user interface element within a user interface of an interaction application includes detecting an association of a supplemental media content item with a primary media content item presented within the user interface. The supplemental media content item is identified from among a plurality of supplemental media content items supported by the interaction application. The method may include retrieving metadata related to the supplemental media content item and presenting, within the user interface, a supplementation affordance that presents the metadata. In some examples, the supplementation affordance is user selectable via the user interface to invoke a supplementation function that enables a user to apply the supplemental media content item to a further primary media content item. The supplementation function is invoked responsive to detecting a user selection of the supplementation affordance within the user interface.

20 Claims, 12 Drawing Sheets

Related U.S. Application Data

(60) Provisional application No. 63/365,160, filed on May 23, 2022.

(51) Int. Cl.
*G06T 11/60* (2006.01)
*G06F 3/16* (2006.01)

(56) References Cited

U.S. PATENT DOCUMENTS

| | | | |
|---|---|---|---|
| 2011/0249073 A1* | 10/2011 | Cranfill | H04M 1/72469 348/14.02 |
| 2013/0067421 A1* | 3/2013 | Osman | G06F 3/0481 715/863 |
| 2013/0178271 A1* | 7/2013 | Aponte | G07F 17/34 463/20 |
| 2014/0213301 A1 | 7/2014 | Evans et al. | |
| 2014/0337475 A1 | 11/2014 | Tolany | |
| 2017/0010846 A1* | 1/2017 | Bernstein | G06F 3/1423 |
| 2017/0024097 A1* | 1/2017 | Lu | H04N 21/4316 |
| 2019/0347181 A1* | 11/2019 | Cranfill | G06F 11/3013 |
| 2020/0014985 A1* | 1/2020 | Garmark | H04N 21/4825 |
| 2020/0053207 A1 | 2/2020 | Kats et al. | |
| 2021/0303140 A1 | 9/2021 | Mourkogiannis | |
| 2022/0027110 A1* | 1/2022 | Abe | G06F 3/1268 |
| 2022/0070385 A1 | 3/2022 | Van Os et al. | |
| 2022/0103603 A1* | 3/2022 | Vendrow | G06F 3/04842 |
| 2022/0141522 A1* | 5/2022 | Saraf | G06F 3/1446 348/564 |
| 2022/0180898 A1* | 6/2022 | Ahmed | H04N 21/84 |
| 2022/0198551 A1* | 6/2022 | Song | G06Q 30/0643 |
| 2023/0007336 A1 | 1/2023 | Chandrashekar et al. | |
| 2023/0254352 A1* | 8/2023 | Chanda | H04L 65/4015 709/204 |
| 2023/0376160 A1 | 11/2023 | Heikkinen et al. | |
| 2023/0376168 A1* | 11/2023 | Ryan | G06F 16/78 |

OTHER PUBLICATIONS

"International Application Serial No. PCT/US2023/022898, Written Opinion mailed Sep. 13, 2023", 3 pgs.

"U.S. Appl. No. 18/320,691, Notice of Allowance mailed Sep. 28, 2023", 9 pgs.

"International Application Serial No. PCT/US2023/022898, International Preliminary Report on Patentability mailed Dec. 5, 2024", 5 pgs.

* cited by examiner

CONTEXT CARDS FOR MEDIA SUPPLEMENTATION

CLAIM OF PRIORITY

This application is a continuation of U.S. patent application Ser. No. 18/320,691, filed on May 19, 2023, which claims the benefit of priority to U.S. Provisional Application Ser. No. 63/365,160, filed on May 23, 2022, each of which is incorporated herein by reference in its entirety.

TECHNICAL FIELD

The present disclosure relates, generally, to electronic content sharing. More specifically, subject matter disclosed herein relates to systems and methods that utilize affordance user interface elements to facilitate content generation or user interactions.

BACKGROUND

The popularity of computer-implemented programs that permit users to access and interact with content and other users online continues to grow. Various computer-implemented applications exist that permit users to share content with other users through interaction applications, e.g., messaging clients, media clients, or other content sharing clients. Some computer-implemented applications can be designed to run on a mobile device, such as a phone, a tablet, or a wearable device, while having a backend service provided on a server computer system to perform certain operations, e.g., those that may require resources greater than is reasonable to perform at a user device.

An interaction application may enable a publishing user to capture a photo or video, and to share captured content to another device for viewing by a viewing user. The captured content may be augmented or supplemented by the publishing user with items such as filters, media overlays, augmented reality effects, links, audio clips, locations, or the like. The viewing user may interact with the publishing user, or with the shared content, via the interaction application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
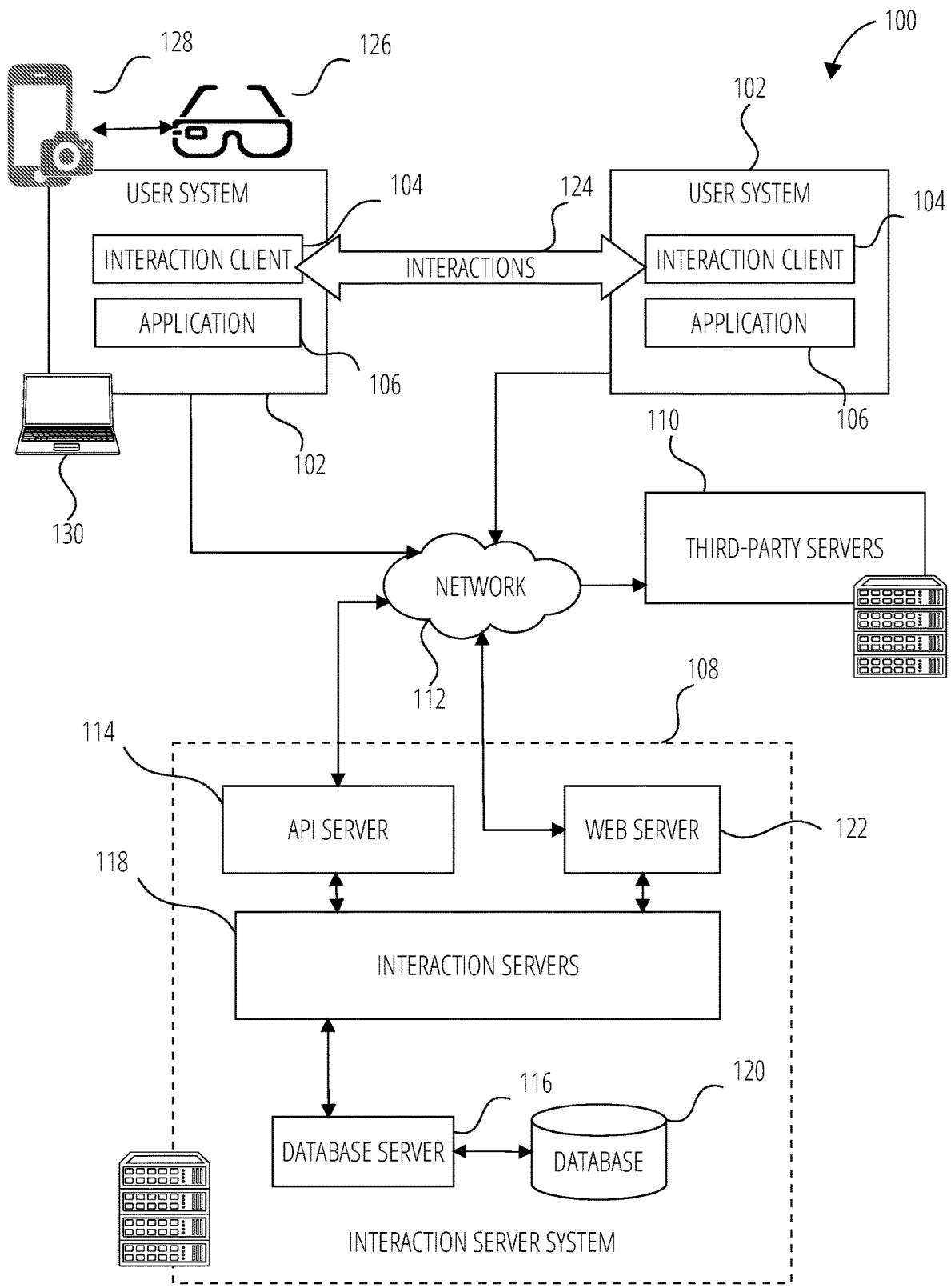
FIG. 1 is a diagrammatic representation of a networked environment in which the present disclosure may be deployed, according to some examples.

In the context of an interaction system that allows users to create and share content, a viewing user may view a media content item shared by a publishing user. The media content item may be an image or video that has been supplemented with supplemental media content items, e.g., by applying a content augmentation (e.g., a filter or media overlay) or a sound clip selected by the publishing user to the image or video. The viewing user may wish to use one or more of the supplementations of the publishing user's media content item to create a new media content item.

It is desirable to facilitate ease of communication of messages and content items between users. Specifically, it is desirable to facilitate the use of content augmentations or supplementations supported by an interaction system. However, a number of technical challenges exist with respect to increasing the convenience and speed with which a user can consume content that includes an augmentation or supplementation, and then create a new content item that is based on, or associated with, the augmentation or supplementation. For example, a viewing user may struggle to identify a particular supplementation applied to a media content item of a publishing user, or may need to search through a database of supported supplementations in order to locate a desired supplementation that was applied to a third-party's content item.

Affordance user interface elements may present visual cues that provide hints as to how users can interact with a digital object, user, or feature. For example, when a user sees a receiver icon on a user interface, the icon provides a hint that selection of the icon enables the user to initiate a call. An affordance user interface element may present an action possibility, or action option, between a user and a media content item within the context of an interaction application. Thus, an affordance, as presented by an affordance user interface element in examples described herein, may be a property or feature of an object (e.g., a property or feature of a media content item) which presents a prompt with respect to one or more ways in which the user can interact with the object.

In some examples, a method is described that presents a supplementation affordance within a user interface of an interaction application. The supplementation affordance may be a context card, or may be included within a context card. The method includes detecting an association of a supplemental media content item (e.g., a content augmentation, media overlay, audio file, or location pin) with a primary media content item (e.g., an image or video) displayed within the user interface of the interaction application. The supplemental media content item is automatically identified from among a plurality of supplemental media content items supported by the interaction application, and metadata (e.g., a title, a creator, an icon, or an animation) related to the supplemental media content item is automatically retrieved.

In some examples, the method includes presenting a context card within the user interface together with a first primary media content item published by a first user (publishing user). The context card presents the metadata related to the supplemental media content item and is user selectable by a second user (viewing user) via the user interface to invoke a supplementation function (e.g., an image augmentation function or an audio supplementation function). Responsive to detection of a user selection of the context card, the supplementation function is invoked within the interaction application. The supplementation function may cause presentation of the relevant supplemental media content item (associated with the context card) for application by the second user to a further primary media content item (e.g., an image or video of the second user's choosing).

In some examples, the supplementation function enables user selection of the further primary media content item and automatic association of the supplemental media content item with the further primary media content item. This provides for improved efficiency, e.g., by significantly reducing selections required to associate a desired supplement media content item with a further primary media content item. For example, the supplementation function may automatically invoke a camera function of the interaction application that allows the user to capture the further primary media content item in such a manner that the supplemental media content item is automatically associated with, or applied to, the further primary media content item.

In some examples, a context card is presented together with the primary media content item within the user interface. The context card may be overlaid on the primary media content item in a viewing user interface that enables the user to view third-party content items.

The primary media content item may be associated with multiple supplemental media content items. For example, the primary media content item may be an image that has an image augmentation and a sound clip applied thereto. In some examples, the method includes automatically retrieving metadata related to each respective supplemental media content item detected to be associated with the primary media content item, and presenting a supplementation affordance for each detected supplemental media content item. Examples described herein enable automatic navigation (e.g., auto-scrolling) to facilitate viewing of multiple supplementation affordances. Examples described herein also enable automatic arrangement of multiple supplementation affordances within the user interface based on context priority.

Technical hurdles to increasing the ease or speed of content item generation may be alleviated by providing affordance user interface elements and related functionalities as described herein. Examples of the present disclosure may enable an interaction system to generate context-aware presentations of media content items, and to simplify or encourage creative expression using technological tools.

When the effects in this disclosure are considered in aggregate, one or more of the methodologies described herein may obviate a need for certain efforts or resources that otherwise would be involved in executing interaction applications. Computing resources used by one or more machines, databases, or networks, may be more efficiently utilized or even reduced, e.g., as a result of automatic presentation of context cards, automatic arrangement, navigation or ranking of supplementation affordances, automatic invoking of supplementation functions, or as a result of a reduced number of selections or user input being required to achieve a desired outcome. Examples of such computing resources may include processor cycles, network traffic, memory usage, graphics processing unit (GPU) resources, data storage capacity, power consumption, and cooling capacity.

Networked Computing Environment

FIG. 1 is a block diagram showing an example interaction system 100 for facilitating interactions (e.g., exchanging text messages, conducting text, audio and video calls, or playing games) over a network. The interaction system 100 includes multiple user systems 102, each of which hosts multiple applications, including an interaction client 104 and other applications 106. Each interaction client 104 is communicatively coupled, via one or more communication networks, including a network 112 (e.g., the Internet), to other instances of the interaction client 104 (e.g., hosted on respective other user systems 102), an interaction server system 108 and third-party servers 110). An interaction client 104 can also communicate with locally hosted applications 106 using Applications Program Interfaces (APIs).

Each user system 102 may include multiple user devices, such as a mobile device 128, a head-wearable apparatus 126, or a computer client device 130, that are communicatively connected to exchange data and messages. An interaction client 104 interacts with other interaction clients 104 and with the interaction server system 108 via the network 112. The data exchanged between the interaction clients 104 (e.g., interactions 124) and between the interaction clients 104 and the interaction server system 108 includes functions (e.g., commands to invoke functions) and payload data (e.g., text, audio, video, or other multimedia data).

The interaction server system 108 provides server-side functionality via the network 112 to the interaction clients 104. While certain functions of the interaction system 100 are described herein as being performed by either an interaction client 104 or by the interaction server system 108, the location of certain functionality either within the interaction client 104 or the interaction server system 108 may be a design choice. For example, it may be technically preferable initially to deploy particular technology and functionality within the interaction server system 108, but later migrate this technology and functionality to the interaction client 104 where a user system 102 has sufficient processing capacity.

The interaction server system 108 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 108, an API server 114 is coupled to and provides programmatic interfaces to interaction servers 118, making the functions of the interaction servers 118 accessible to interaction clients 104, other applications 106, and third-party servers 110. The interaction servers 118 are communicatively coupled to a database server 116, facilitating access to a database 120 that stores data associated with interactions processed by the interaction servers 118. Similarly, a web server 122 is coupled to the interaction servers 118 and provides web-based interfaces to the interaction servers 118. To this end, the web server 122 processes incoming network requests over the Hypertext Transfer Protocol (HTTP) and several other related protocols.

The API server 114 receives and transmits interaction data (e.g., commands and message payloads) between the interaction servers 118 and the user systems 102 (and for example, interaction clients 104 and other application 106) and the third-party servers 110. Specifically, the API server 114 provides a set of interfaces (e.g., routines and protocols) that can be called or queried by the interaction client 104 and other applications 106 to invoke the functionality of the interaction servers 118. The API server 114 exposes various functions supported by the interaction servers 118, including account registration; login functionality; creation of new media content items, the sending of interaction data, via the interaction servers 118, from a particular interaction client 104 to another interaction client 104; the communication of media files (e.g., images or video) from an interaction client 104 to the interaction servers 118; the settings of a collection of media data (e.g., a story); the retrieval of a list of friends of a user of a user system 102; the retrieval of messages and content; the addition and deletion of entities (e.g., friends) to an entity graph (e.g., an entity graph); the location of friends within an entity graph; and opening an application event (e.g., relating to the interaction client 104).

The interaction servers 118 host multiple systems and subsystems, described below with reference to FIG. 2.

System Architecture

Figure 2:
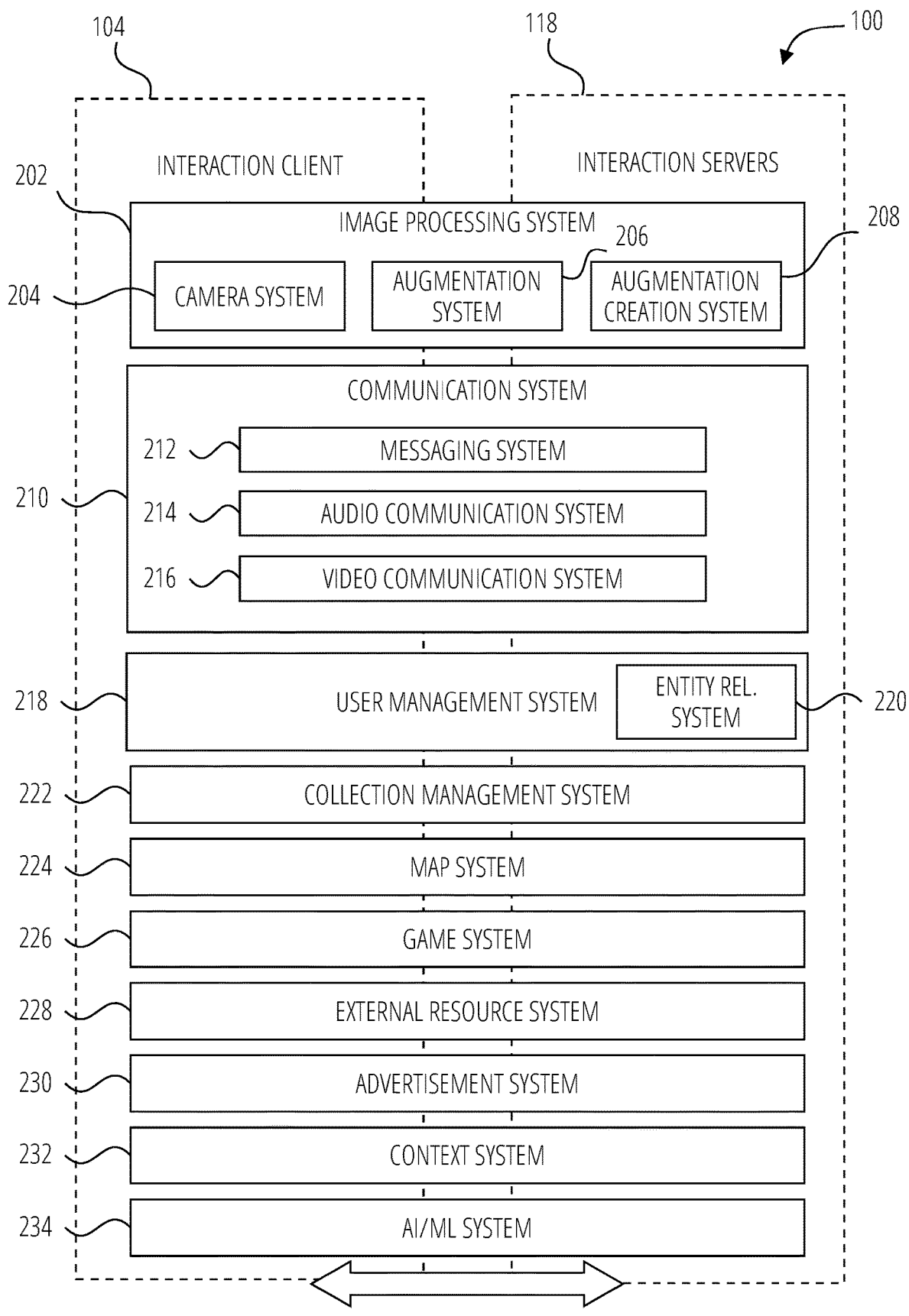
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 118. The interaction system 100 embodies multiple subsystems, which are supported on the client-side by the interaction client 104 and on the server-side by the interaction servers 118.

In some examples, one or more subsystems are implemented as microservices. A microservice subsystem (e.g., a microservice application) may have components that enable it to operate independently and communicate with other services. Example components of microservice subsystems may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 116 and database 120). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

Example subsystems are discussed below. Firstly, an image processing system 202 of the interaction system 100 provides various functions that enable a user to capture and augment (e.g., annotate or otherwise modify or edit) media content associated with a message (e.g., a "post," a direct message, or a group message). As mentioned above, content may be augmented or supplemented with items such as filters, media overlays, augmented reality effects, links, audio clips, locations, or the like.

A camera system 204 includes control software (e.g., in a camera application) that interacts with and controls hardware camera hardware (e.g., directly or via operating system controls) of the user system 102 to modify and augment real-time images captured and displayed via the interaction client 104. An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1122 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, songs, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 210, such as the messaging system 212 and the video communication system 216.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 120 and accessed through the database server 116.

In some examples, where an augmentation has been applied to an original content item (e.g., to an image or video), the original content item is referred to as the "primary media content item," and the augmentation is referred to as the "supplemental media content item." In some examples, a primary media content item may have multiple associated supplemental media content items. For example, a user may capture or select an image and apply a specific image filter thereto. The image filter may be referred to as a supplemental media content item, while the image is referred to as the primary media content item. The user may also, for example, add an audio clip such that it plays when the image is being viewed on the interaction client 104. The audio clip may thus be regarded as a further supplemental media content item. It will be appreciated that, in some cases, the augmentation may be applied to an image or video in real-time, resulting in there not being a separately existing "original content item," as such. However, in the context of this disclosure, the term "primary media content item" is still used to refer to the primary, or base item, e.g., the image itself, while the term "supplemental media content item" is used to identify the specific augmentation (or other supplementation) that was applied by the user to generate the content item in real-time. As described further below (with reference to the context system 232), a "supplemental media content item" may also refer to another type of item that is associated with, and not necessarily applied to, the primary media content item, such as a request or a content collection.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 208 supports augmented reality developer platforms and includes an application for content creators (e.g., artists and developers) to create and publish augmentations (e.g., augmented reality experiences) of the interaction client 104. The augmentation creation system 208 provides a library of built-in features and tools to content creators including, for example custom shaders, tracking technology, and templates.

In some examples, the augmentation creation system 208 provides a merchant-based publication platform that enables merchants to select a particular augmentation associated with a geolocation via a bidding process. For example, the augmentation creation system 208 associates a media overlay of the highest bidding merchant with a corresponding geolocation for a predefined amount of time.

A communication system 210 is responsible for enabling and processing multiple forms of communication and interaction within the interaction system 100 and includes a messaging system 212, an audio communication system 214, and a video communication system 216. In some examples, the messaging system 212 is responsible for enforcing temporary or time-limited access to content by the interaction clients 104. The messaging system 212 incorporates multiple timers that, based on duration and display parameters associated with a message or collection of messages (e.g., a story), selectively enable access (e.g., for presentation and display) to messages and associated content via the interaction client 104. The audio communication system 214 enables and supports audio communications (e.g., real-time audio chat) between multiple interaction clients 104. Similarly, the video communication system 216 enables and supports video communications (e.g., real-time video chat) between multiple interaction clients 104.

A user management system 218 is operationally responsible for the management of user data and profiles, and includes an entity relationship system 220 that maintains information regarding relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system 224 provides various geographic location functions and supports the presentation of map-based media content and messages by the interaction client 104. For example, the map system 224 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 226 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 228 provides an interface for the interaction client 104 to communicate with remote servers (e.g., third-party servers 110) to launch or access external resources, i.e., applications or applets. Each third-party server 110 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 110 associated with the web-based resource. Applications hosted by third-party servers 110 are programmed in JavaScript leveraging a Software Development Kit (SDK) provided by the interaction servers 118. The SDK includes Application Programming Interfaces (APIs) with functions that can be called or invoked by the web-based application. The interaction servers 118 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party servers 110 from the interaction servers 118 or is otherwise received by the third-party servers 110. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 108 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 110 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 110. The SDK limits which information is shared based on the needs of the external resource. Each third-party server 110 provides an HTML5 file corresponding to the web-based external resource to interaction servers 118. The interaction servers 118 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 230 operationally enables the purchasing of advertisements by third parties for presentation to end-users via the interaction clients 104 and also handles the delivery and presentation of these advertisements.

A context system 232 provides various functions for providing contextual content associated with a media content item (e.g., a message with media content, a media collection, etc.). In some examples, the context system 232 provides for specifying types of context that may be associated with a media content item.

For example, the different types of context include, but are not limited to: a request (e.g., where the media content item corresponds to a request, such as a friend request); an invitation to a group/event chat (e.g., where the media content item corresponds to the invitation); an invitation to a private media collection (e.g., where the media content item corresponds to the invitation); commerce (e.g., where the media content item corresponds to commerce, such as an on-line purchase); a non-sponsored attachment (e.g., where the media content item includes the attachment), a game (e.g., where the media content item corresponds to initiating/playing a game via the game system 226); a user profile (e.g., where the media content item references another user account via the user management system 218); music (e.g., where the media content item includes music or other audio content); augmented reality content (e.g., where the media content item includes an augmented reality content item, or has an augmentation applied or overlaid thereon); a venue (e.g., where the media content item references a venue); a sponsored attachment (e.g., where the media content item includes the attachment); and/or a third-party application (e.g., where the media content item references content from and/or links to a third-party application). As discussed above, in some examples, the main, or underlying, media content item is referred to as the "primary media content item," while context data added thereto or associated therewith may be referred to as a "supplemental media content item."

In addition to defining context items and types of context, the context system 232 provides for generating and displaying context information interfaces or context information elements (e.g., context cards). In some examples, each context card provides supplemental information with respect to context associated with the media content item. Using the above-listed types of context as an example, the supplemental information for a context card may relate to a respective request, invitation to a group/event chat, invitation to a private content collection, commerce, attachment, game, referenced user profile, music, augmented reality content item, specific augmentation applied to a content item, venue, sponsored attachment, and/or third-party application associated with a media content item.

The context system 232 is configured to identify a context type or multiple context types present in a media content item. For example, where a publishing user posts an image that has been augmented with a selected content augmentation, and further supplemented with a selected audio item that plays when then the image is being viewed, the context system 232 may detect the context in or associated with the media content item. In response to detecting the context, the context system 232 may cause surfacing of appropriate supplementation affordances, e.g., context cards, examples of which are included below. The context system 232 may detect the context type, or context category, of each "supplemental media content item," and surface the context cards based on context type.

In some examples, context cards may be presented together with display of the media content item (e.g., media content item 404). Moreover, one or more context cards may be user-selectable (e.g., via a tap gesture or a press-and-hold gesture), for example, to access an image, video, sound, text, hyperlink, animation, third party application, or any other suitable content that is associated with the selected context card.

Various functions or features of the interaction system 100 may incorporate, or use, artificial intelligence (AI) and machine learning (ML). The interaction system 100 may thus include an AI/ML system 234. For example, the AI/ML system 234 operates with the image processing system 202 and the camera system 204 to analyze images and extract information such as objects, text, or faces. This information can then be used by the image processing system 202 to enhance, filter, or manipulate images. The AI/ML system 234 may be used by the augmentation system 206 to generate augmented content and augmented reality experiences, such as adding virtual objects or animations to real-world images. The communication system 210 and messaging system 212 may use the AI/ML system 234 to analyze communication patterns and provide insights into how users interact with each other and provide intelligent message classification and tagging, such as categorizing messages based on sentiment or topic. The context system 232 may use the AI/ML system 234 to identify context in, or relating to, a media content item, or a collection of media content items. For example, the context system 232 may work with the AI/ML system 234 to analyze a primary media content item in order to determine a supplemental media content item associated with the primary media content item. The AI/ML system 234 may also provide chatbot functionality to message interactions 124 between user systems 102 and between a user system 102 and the interaction server system 108. The AI/ML system 234 may also work with the audio communication system 214 to provide speech recognition and natural language processing capabilities, e.g., allowing users to interact with the interaction system 100 using voice commands.

Data Architecture

Figure 3:
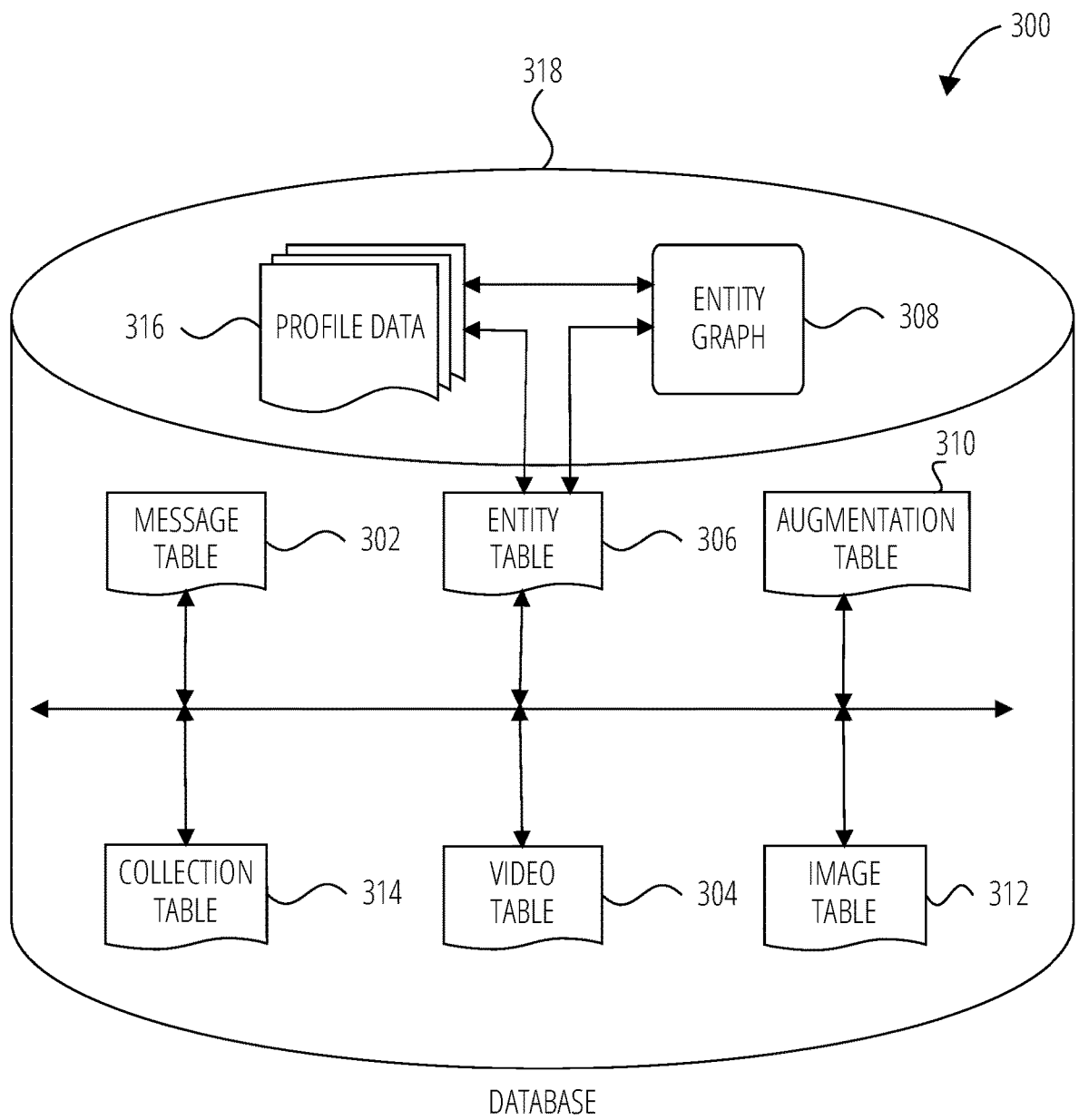
FIG. 3 is a diagrammatic representation of a data structure as maintained in a database, according to some examples.

FIG. 3 is a schematic diagram illustrating data structures 300, which may be stored in the database 318 of the interaction server system 108, according to certain examples. While the content of the database 318 is shown to comprise multiple tables, it will be appreciated that the data could be stored in other types of data structures (e.g., as an object-oriented database).

The database 318 includes message data stored within a message table 302. This message data includes, for any particular message, at least message sender data, message recipient (or receiver) data, and a payload. Further details regarding information that may be included in a message, and included within the message data stored in the message table 302, are described below with reference to FIG. 10.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the interaction server system 108 stores data may be a recognized entity. Each entity is provided with a unique identifier, as well as an entity type identifier (not shown). The entity graph 308 stores information regarding relationships and associations between entities. Such relationships may be social, professional (e.g., work at a common corporation or organization), interest-based, or activity-based, merely for example.

The profile data 316 stores multiple types of profile data about a particular entity. The profile data 316 may be selectively used and presented to other users of the interaction system 100 based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 318 also stores augmentation data, such as overlays or filters, in an augmentation table 310. The augmentation data is associated with and applied to media content items, such as videos (for which data is stored in a video table 304) and images (for which data is stored in an image table 312). Augmentation data may also include other types of supplemental data, such as audio or location data, with which a video or image can be supplemented.

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 312 includes augmented reality content items (e.g., corresponding to lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, a computer animation model to transform image data can be used by a system where a user may capture an image or video stream of the user (e.g., a selfie) using the user system 102 having a neural network operating as part of an interaction client 104 operating on the user system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

In some examples, augmentation data in the augmentation table 310 includes metadata that is descriptive of a respective augmentation or media content item to which it is applied. For example, where an augmentation is an image filter or lens, an icon or other indicium may be included in the metadata. The metadata may also include a title for the associated augmentation as well as the bibliographic details (e.g., name) of a creator and/or owner of the augmentation. This may enable the interaction system 100, e.g., using the context system 232, to identify an augmentation that has been applied to a media content item (e.g., to identify a supplemental media content item linked to a primary media content item), and retrieve the metadata of the augmentation from the augmentation table 310 in order to surface some of the metadata to a user via the interaction client 104.

A collection table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in some examples, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Figure 4:
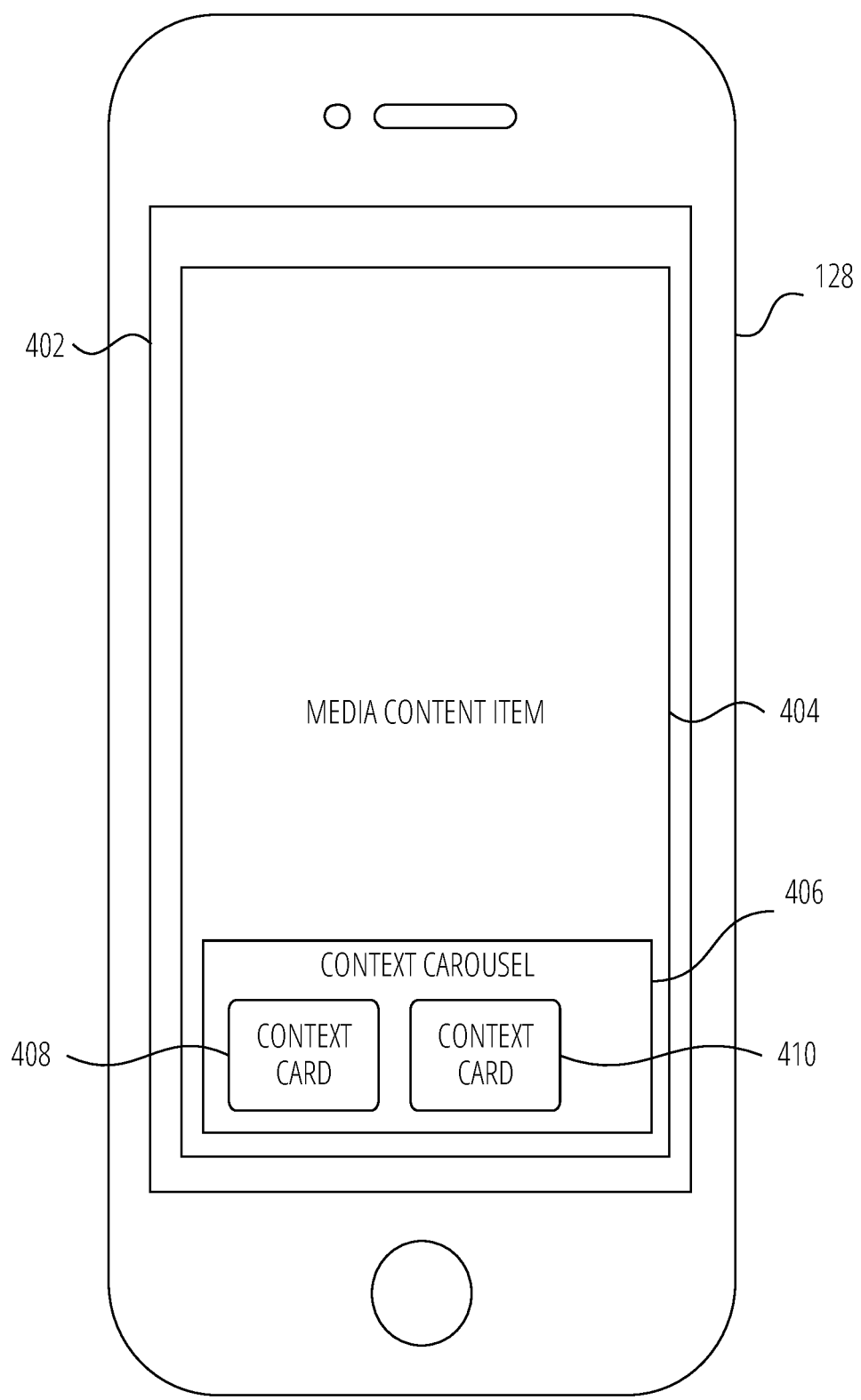
FIG. 4 is a user interface diagram illustrating a user interface that presents a media content item and affordance user interface elements, according to some examples.

FIG. 4 is a user interface diagram showing a user interface 402, as may be presented on the display of a mobile device 128 (as an example of a user system 102) by the interaction system 100, according to some examples. The user interface 402 may be a viewing user interface of the interaction client 104 that enables a viewing user to view content items, e.g., content items sent directly to the viewing user by a publishing user, or content items forming part of public or shared content collections accessible to the viewing user.

It is noted that while the example interfaces in FIGS. 4, 5 and 7-9 are described and shown as being presented on a touch screen, such as a screen of the mobile device 128, interfaces according to some examples may also be presented using other types of devices that can provide suitable user interfaces or displays, e.g., the optical display of a head-wearable apparatus 126, a desktop computer, or via smart contact lenses. Examples of the present disclosure are thus not restricted to user interfaces that require touch-based gestures.

The user interface 402 presents, to the viewing user, a media content item 404, which may comprise an image, a video, or an audio track, for example. The user interface 402 further presents an affordance user interface element in the example form of a context carousel 406 that presents a set of user interface elements that are supplementation affordances, in the example form of context cards 408 and 410. In the example of FIG. 4, the context cards 408 and 410 are located in a lower section of the user interface 402 and overlaid on the media content item 404. The context cards may, for example, be translucent in order to provide the viewing user with a partial view of the portion of the media content item 404 that the context carousel 406 is overlaid on.

Each context card is associated with a respective supplemental media content item, such as, for example, an image augmentation (e.g., a lens or filter) or an audio file that has been associated with the displayed (primary) media content item 404. Each context card is user-selectable to invoke a function, referred to as supplementation function, that allows a user conveniently to associate the relevant supplemental media content item with a primary media content item of their choosing (e.g., a newly captured primary media content item).

For example, a first context card 408 may be associated with an image filter (augmentation that changes the appearance of the image) applied to the media content item 404, and a second context card 410 may be associated with an audio track that is overlaid on, or linked so as to play together with presentation of, the media content item 404. By user selection of the context card 408 associated with the image filter, a user can conveniently invoke a supplementation function in the example form of a filter application function within the context of the interaction client 104 that allows the user to apply the same image filter directly to a primary media content item 404 of the user's choosing. Similarly, by user selection of the context card 410 associated with the audio track, the user can invoke a supplementation function in the example form of an audio application function within the context of the interaction client 104 that allows the user conveniently to apply the audio track to a further primary media content item 404 of the user's choosing. In other words, the viewing user does not have to search for these supplementations, as the interaction client 104 can be used to apply them to new content automatically.

During operation, the context system 232 may detect the supplemental media content items associated with the media content item 404, and retrieve metadata of each supplemental media content item, e.g., from the augmentation table 310, as described above. The metadata may include, for example, an icon identifying the supplemental media content item, as well as text, such as a title of the relevant augmentation or content, or the name of a creator or owner thereof. The metadata may also include visual cues as to the relevant context type, e.g., an audio-related context card may present an audio content identifier, while an image filter context card may present an image filter identifier.

Figure 5:
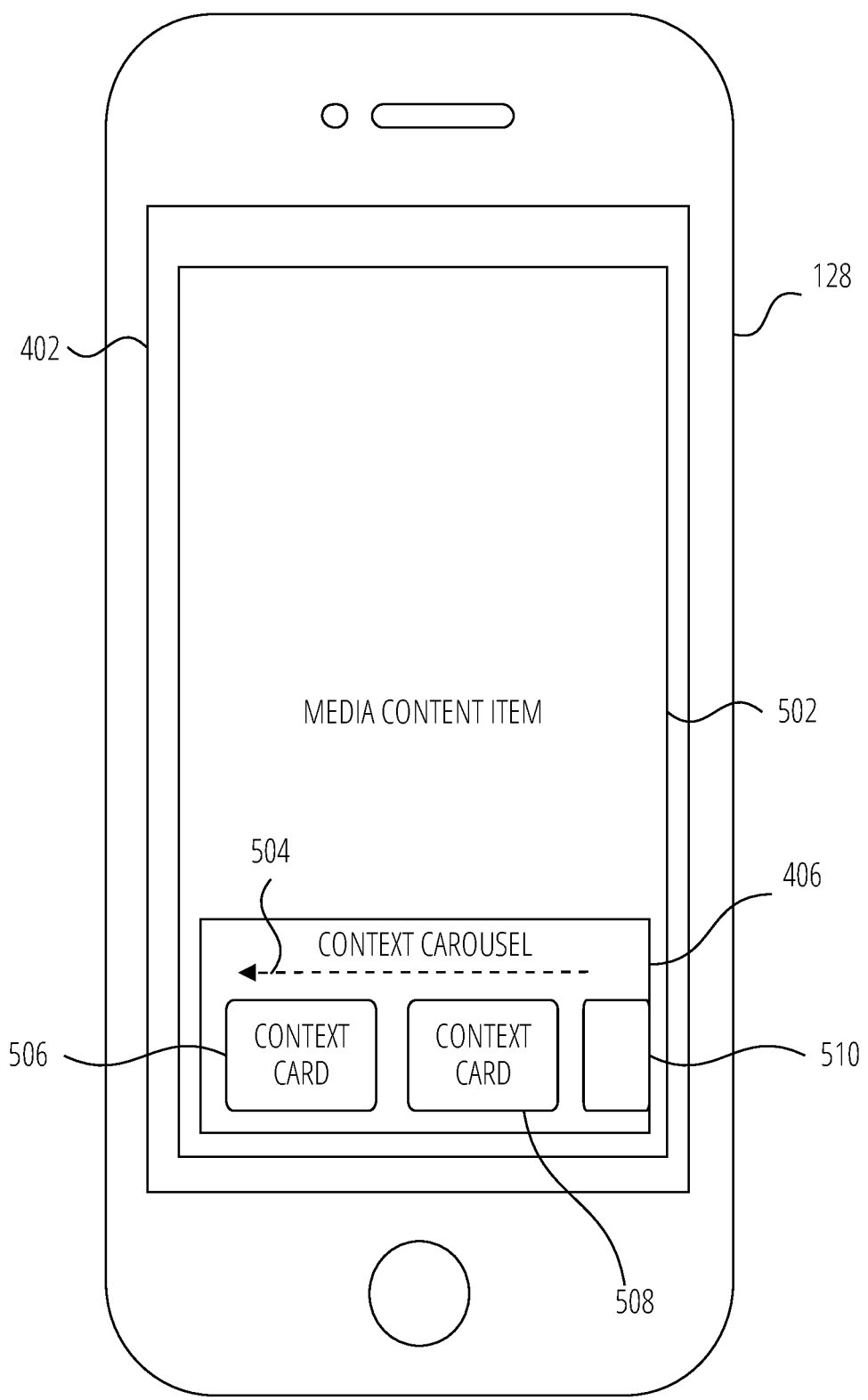
FIG. 5 is a user interface diagram illustrating a user interface that presents a media content item and affordance user interface elements, according to some examples.

In some cases, the available area (space) within the user interface 402 may be insufficient to display all context cards simultaneously. While the user may scroll or otherwise navigate manually to view context cards that are not (or not fully) visible, in some examples, the interaction client 104 may invoke an automatic scrolling function better to accommodate such context cards. FIG. 5 is a user interface diagram showing the user interface 402 of FIG. 4, displaying a further media content item 502.

The media content item 502 includes three supplemental media content items. For example, the media content item 502 may include two image filters and an audio file selected by a publishing user. As explained above, the interaction system 100 detects the relevant context information and surfaces context cards corresponding to each supplemental media content item: a context card 506, a context card 508, and a context card 510. The interaction client 104 detects that there is insufficient user interface area for presentation of the three context cards within the user interface 402, or detects that the number of context cards to be presented exceeds a threshold (e.g., more than two context cards are to be presented). In response to this detection, the interaction client 104 invokes an automatic scrolling function that causes movement of the context cards 506, 508, and 510, relative to the media content item 502. For example, the interaction client 104 may cause the context cards to move gradually in a scrolling direction 504, with the user interface 402 cycling through the available context cards, e.g., once the context card 506 disappears from view on the left side of the user interface 402, it may reappear again from the right, traveling in the scrolling direction 504.

This may allow the viewing user more easily or conveniently to view or access the context cards. The viewing user may manually stop the automatic scrolling, e.g., by tapping within the context carousel 406. In response to detecting a user selection of one of the context cards, the interaction client 104 invokes the supplementation function associated with that context card. This may involve presenting the supplemental media content item (e.g., the relevant augmentation) for application by the user within the context of the interaction client 104.

In some examples, the automatic scrolling function may be activated after a predefined period. For example, if the interaction client 104 detects that the user has viewed the media content item 502 for more than three seconds, the interaction client 104 may commence with automatic scrolling to enable the user more easily to view and interact with the context cards.

Where multiple context cards are to be surfaced, the context system 232 may automatically identify a context type of each supplemental media content item. For example, in the case of FIG. 4, the context system 232 may determine that the context card 408 has a first context type and that the context card 410 has a second context type. The context cards may then automatically be arranged based on context priority. For example, the context system 232 may determine or apply a context priority indicating that an image filter context card is to be presented "before" (e.g., to the left of) other context cards, and arrange the context card 408 and the context card 410 accordingly.

Figure 6:
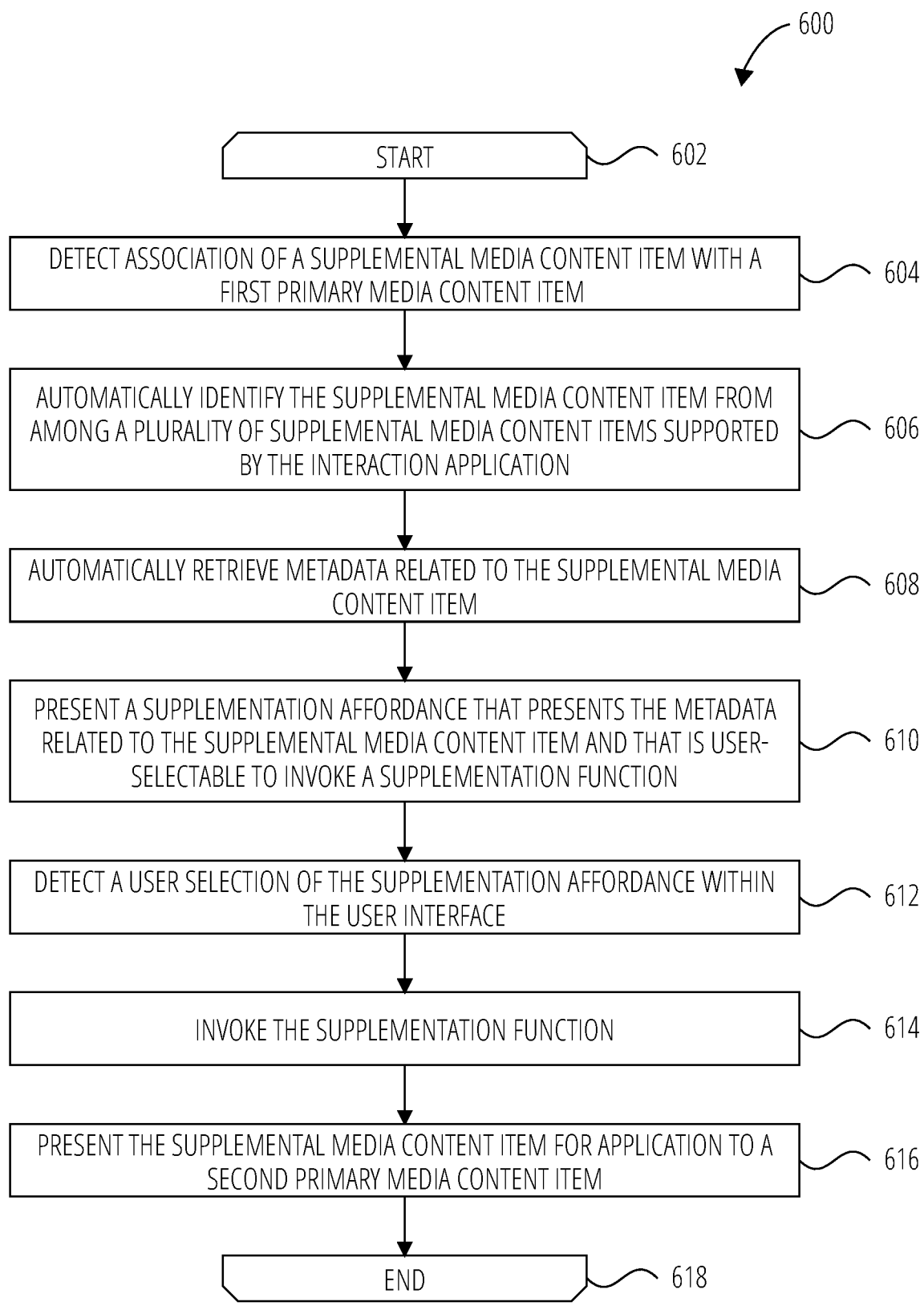
FIG. 6 is a flowchart illustrating a method suitable for presenting and enabling user selection of an affordance user interface element within a user interface of an interaction application, according to some examples.

FIG. 6 is a flowchart illustrating a method 600, according to some examples, to enable a user of the interaction client 104, on a user system 102, to apply supplemental media (e.g., an augmentation such as a lens, or an audio file) to primary media content (e.g., a photo or video that the user may have created or selected from a storage component). The method 600 is performed, in some examples, by various subsystems of the interaction system 100, e.g., the messaging system 212, the augmentation system 206, and/or the context system 232.

The method 600 commences at opening loop element 602, and progresses to operation 604, where the context system 232 detects an association of a supplemental media content item, such as an augmentation or audio file, with a primary media content item (e.g., a photo or video) that a user is viewing within a user interface of an interaction application (e.g., the interaction client 104). At operation 606, the context system 232 automatically identifies one or more supplemental media content items (e.g., augmentations and audio files), e.g., from a library of supplemental media content items or from an augmentation table 310, supported by the interaction system 100. For example, the interaction client 104 may support thousands of different augmentations, and the interaction client 104 may identify the relevant augmentation from among all the supported augmentations.

In some examples, supplemental media content items may be identified using metadata linked to the primary media content item. For example, when the publishing user creates the primary media content item and adds the relevant supplemental media content item thereto, metadata identifying the supplemental media content item may be stored in association with an identifier of the primary media content item in a database 120, or in association with a message including the content (see the message 1000 in FIG. 10). In some examples, the interaction system 100 may analyze or process the primary media content item, e.g., using the AI/ML system 234, to identify the supplemental media content items. For example, the AI/ML system 234 may execute a "filter identification" ML model that uses computer vision to detect the relevant augmentation.

Figure 7:
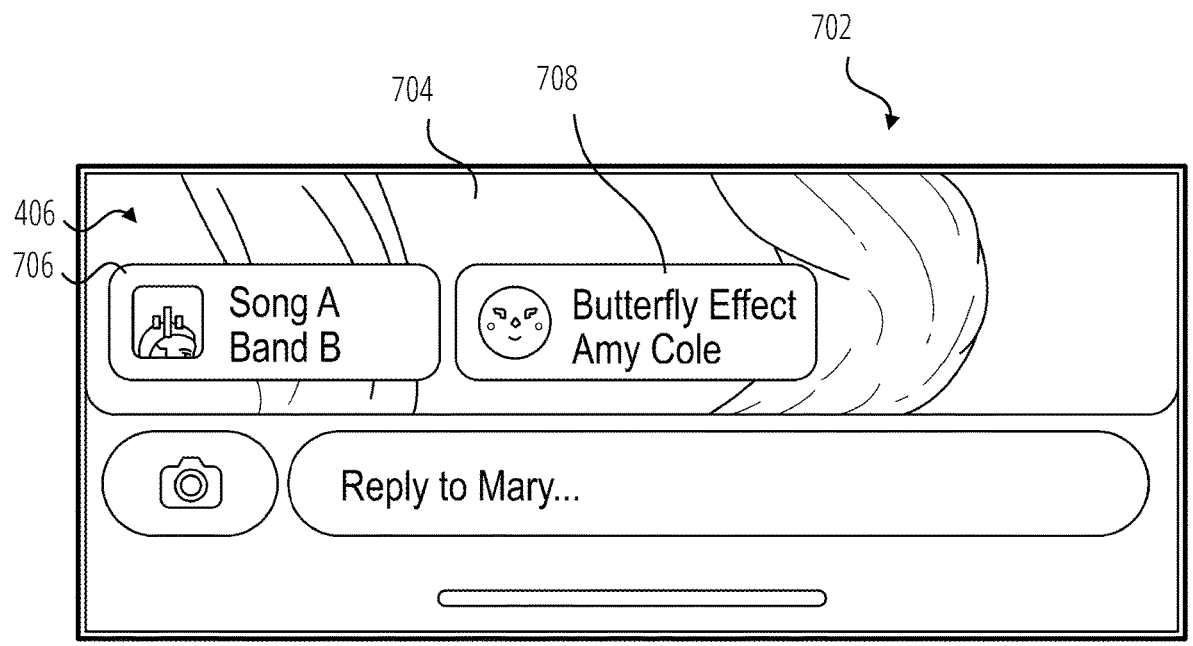
FIG. 7 is a user interface diagram illustrating a lower section of a user interface in which affordance user interface elements are overlaid on a media content item, according to some examples.
Figure 8:
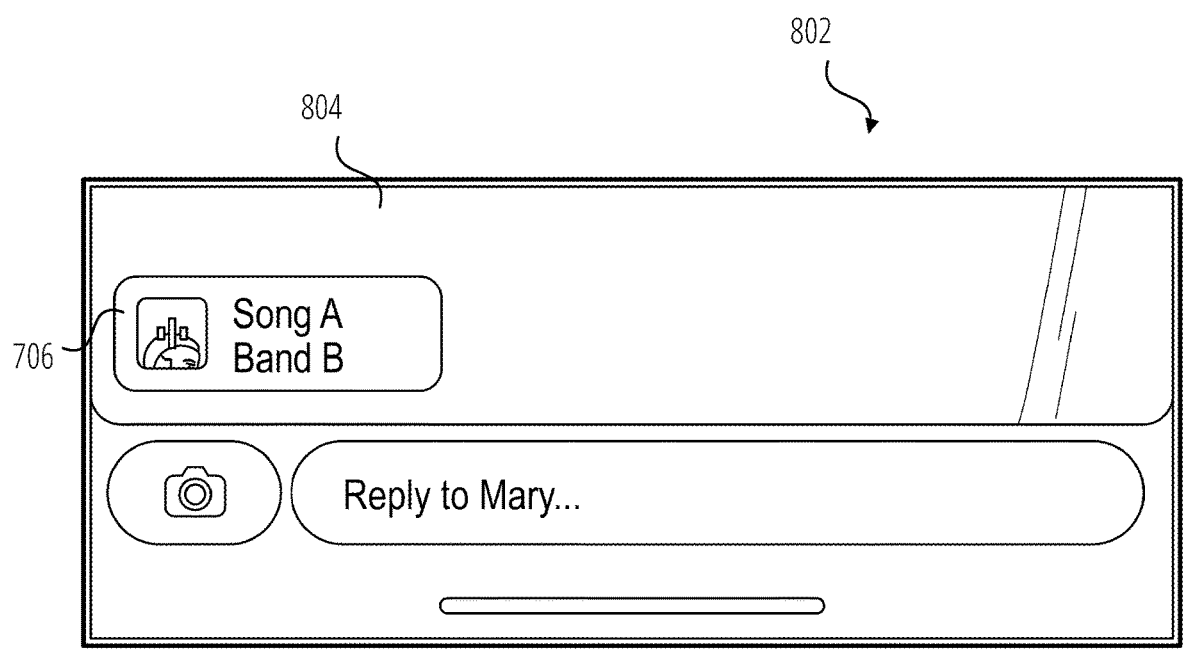
FIG. 8 is a user interface diagram illustrating a lower section of a user interface in which an affordance user interface element is overlaid on a media content item, according to some examples.

Referring to FIG. 7 and FIG. 8, these user interface diagrams show partial views of a viewing user interface 702 and a viewing user interface 802, respectively, according to some examples. The viewing user interface 702 presents a primary media content item 704 and the viewing user interface 802 presents a primary media content item 804. In FIG. 7, the media content item 704 is a video clip to which an audio file (e.g., a song) has been linked and to which an image augmentation (e.g., image filter or modification) has been applied, as indicated by the audio context card 706 and the lens context card 708, respectively. In FIG. 8, the media content item 804 is an image to which the audio file has been linked, as indicated by the audio context card 706.

Accordingly, the context system 232 may automatically determine that the primary media content item has been augmented or supplemented, and identify each relevant supplemental media content item. Returning to FIG. 6, at operation 608, the context system 232 then automatically retrieves metadata associated with the identified supplemental media content item, identified at operation 606, e.g., from the database 318. As noted above, this metadata may include graphic elements (e.g., icons or other images), and textual information (e.g., a title or details and author or creator).

At operation 610, the context system 232 then presents, within a user interface of the interaction client 104, an interface element in the form of a supplemental affordance that presents the metadata related to the supplemental media content item. In some examples, the supplemental affordance is a context card that is presented within the context of a context carousel 406. Each context card, presented within a context carousel 406, is also user-selectable to invoke a supplementation function, such as those provided by the augmentation system 206. As noted above, multiple supplemental media content items may be identified, at operation 606, as being associated with (e.g., applied to) the primary media content item. In this case, metadata related to the multiple supplemental media content items is automatically retrieved at operation 608, and, at operation 610, multiple context cards 410 that include the retrieved metadata may be presented within a context carousel 406, as shown in FIG. 7.

In FIG. 7, the viewing user interface 702 is shown to include a context carousel 406 that includes two context cards, namely the audio context card 706 and the lens context card 708. The audio context card 706 includes metadata for an audio file (as an example of a supplemental media content item) associated with the media content item 704. The audio context card 706 includes metadata for a song, namely "Song A," and the name of an artist ("Band B"). The lens context card 708 includes metadata for a "Butterfly Effect" filter, also associated with the media content item 704 (e.g., where the "Butterfly Effect" filter is applied to a facial image that is included in the media content item 704), and the name of the creator ("Amy Cole"). In each of these instances, the metadata thus includes a title of the supplemental media content item, as well as an artist (in the case of the audio file) or a creator (in the case of the image filter).

As mentioned above, the context system 232 may be configured automatically to arrange supplementation affordances relative to each other within a user interface based on the context priority. For example, in FIG. 7, the context system 232 may determine a context priority indicating that audio files take priority over other context types, and therefore cause presentation of the audio context card 706 to the left of the lens context card 708.

Returning to FIG. 6, at operation 612, user selection of a supplemental affordance within the user interface (e.g., audio context card 706 or lens context card 708) is detected by the context system 232 and, at operation 614, responsive to the detection of this user selection, the context system 232 invokes a supplementation function (e.g., a function provided by the augmentation system 206). In addition to invoking the supplementation function, the context system 232 also identifies the relevant supplemental media content item (e.g., the audio file or the filter) to the invoked supplementation function (e.g., the camera system 204), which then makes the relevant supplemental media content item available to a user (operation 616), within the context of the interaction system 100, for application to or association with a further (second) primary media content item (e.g., the "Butterfly Effect" filter is made available within a camera function for application to a photograph or image selected by the user).

In the context of the example described with reference to FIG. 7, this may involve making "Song A" available to a user, responsive to the selection of the audio context card 706, within a creation interface to overlay on, or link with, a video or image selected by the user. Similarly, user selection of the lens context card 708 may invoke an augmentation function provided by the augmentation system 206 within the context of a camera, and identification or presentation of the "Butterfly Effect" filter to the user for modification/enhancement to an image selected by the user (examples of this camera function are described with reference to FIG. 9 below). The method 600 terminates at closing loop element 618.

Accordingly, it will be appreciated that the method 600 may provide a convenient way for a user, when viewing content that has been modified or supplemented with a supplemental media item, to use the same supplemental media content (e.g., an image or video). In this way, a user may conveniently take inspiration drawn from the augmentation or supplementation of media by other users, and apply it to their own content (e.g., a picture that they may have taken or a video that they may have captured) through the use of an improved user interface system and associated functionality.

In some examples, metadata included in a supplementation affordance may include an animation, e.g., an animated audio-representing user interface element. For example, the audio context card 706 may include not only the title of the song and the name of the artist, but also an animated audio-representing user interface element in the example form of an icon for the audio file, with an animation overlaid on the icon, as shown in FIG. 7 and FIG. 8. In FIG. 7 and FIG. 8, the icon may be presented so as to appear to have animated "audio bars" overlaid thereon. While the user is viewing the audio context card 706, the animation may be played to cause the bars to move dynamically, thus providing a further visual cue to the user that the audio context card 706 identifies the song applied to the relevant media content item and/or that the user can select the audio context card 706 to apply the song to their own content.

Figure 9:
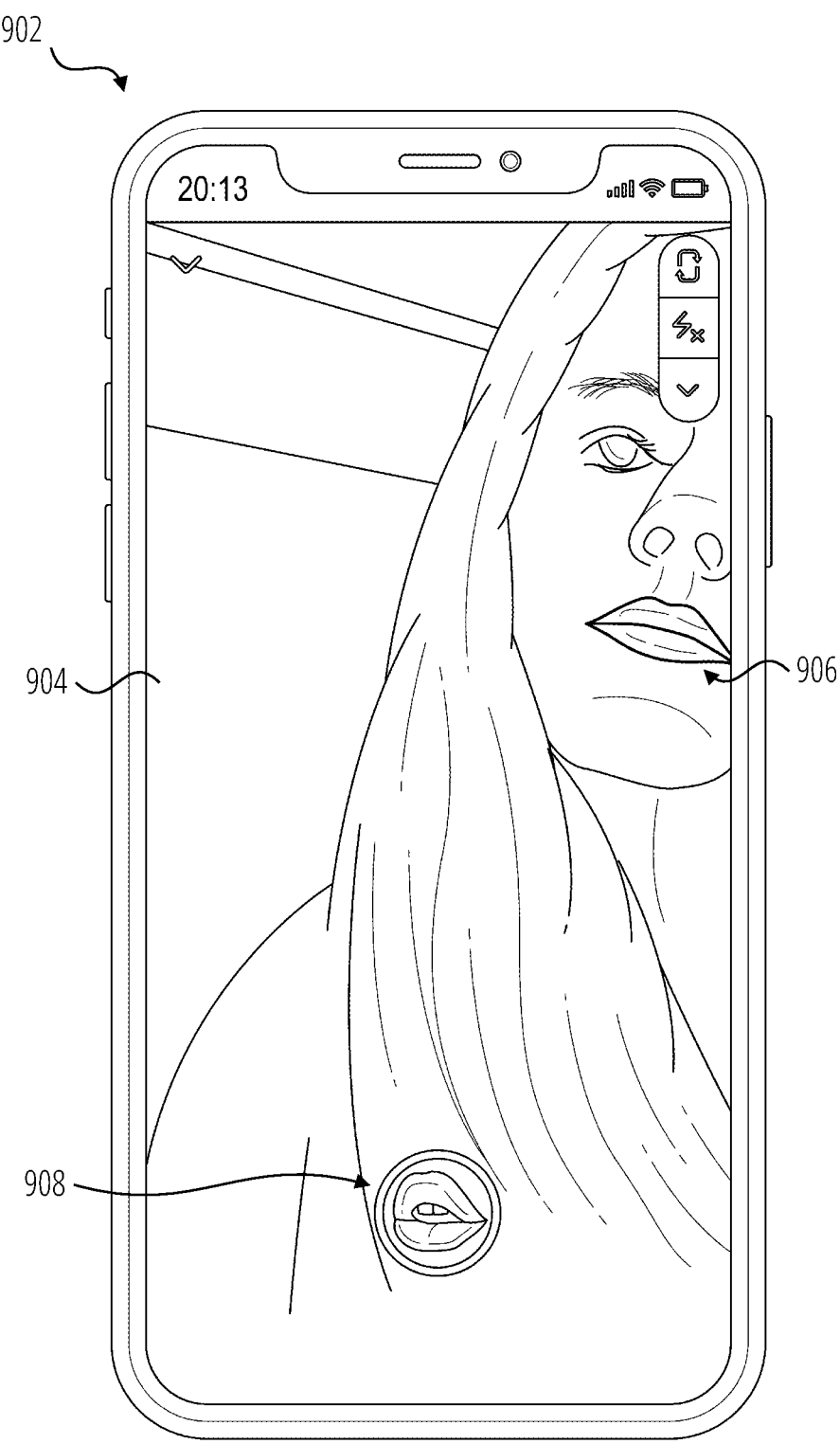
FIG. 9 is a user interface diagram illustrating a camera function of an interaction application, according to some examples.

As mentioned, in some examples, a context card is user selectable to invoke a supplementation function. Where the context card identifies an augmentation that may be applied using a camera function, the activation of the supplementation function may comprise automatically launching an augmentation function, e.g., via a camera function of the interaction client 104, to enable the user to capture a further (second) primary media content item in such a manner that the supplemental media content item is automatically applied to the second primary media content item FIG. 9 is a further user interface diagram showing a camera function user interface 902, according to some examples, in which a further primary media content item 904 is displayed. For example, a (first) primary media content item may include an image to which a "Lips Lens" was applied to augment lips of a person in the image, and the interaction client 104 may present to the viewing user a context card (not shown) that identifies the "Lips Lens." The viewing user then selects the context card that represents the "Lips Lens" within the user interface displaying the (first) primary media content item. In response to the selection, the interaction client 104 launches the camera function and presents the camera function user interface 902 of FIG. 9 to enable the user to create the further primary media content item 904. The camera function user interface 902 may provide a real-time camera feed (e.g., from a camera of the mobile device 128) to enable the user to capture a desired image or video.

The "Lips Lens" is automatically pre-selected such that it can conveniently be applied by the user once the camera function user interface 902 is presented. As shown in FIG. 9, the lips augmentation 906 is automatically applied to a face of a user within the camera function user interface 902. A capture button 908 is user selectable to capture the further primary media content item 904, including its supplemental media content item (the "Lips Lens"). It will be appreciated that additional options, such as options to change the augmentation applied to the image, may be included in the camera function user interface 902, e.g., by way of an augmentation carousel that includes the capture button 908.

In other examples, instead of using the real-time camera feed to capture new content, the user may select an image or video stored on the mobile device 128 (or in a cloud-based storage resource), so that the viewing user can conveniently apply the "Lips Lens" to a selected image or video accessible to and selected by the user.

Accordingly, it will be appreciated that techniques or interfaces described herein may simplify navigation and facilitate creative expression, e.g., by automatically presenting or invoking "shortcuts" for the generation of new content that is inspired by viewed content.

Data Communications Architecture

Figure 10:
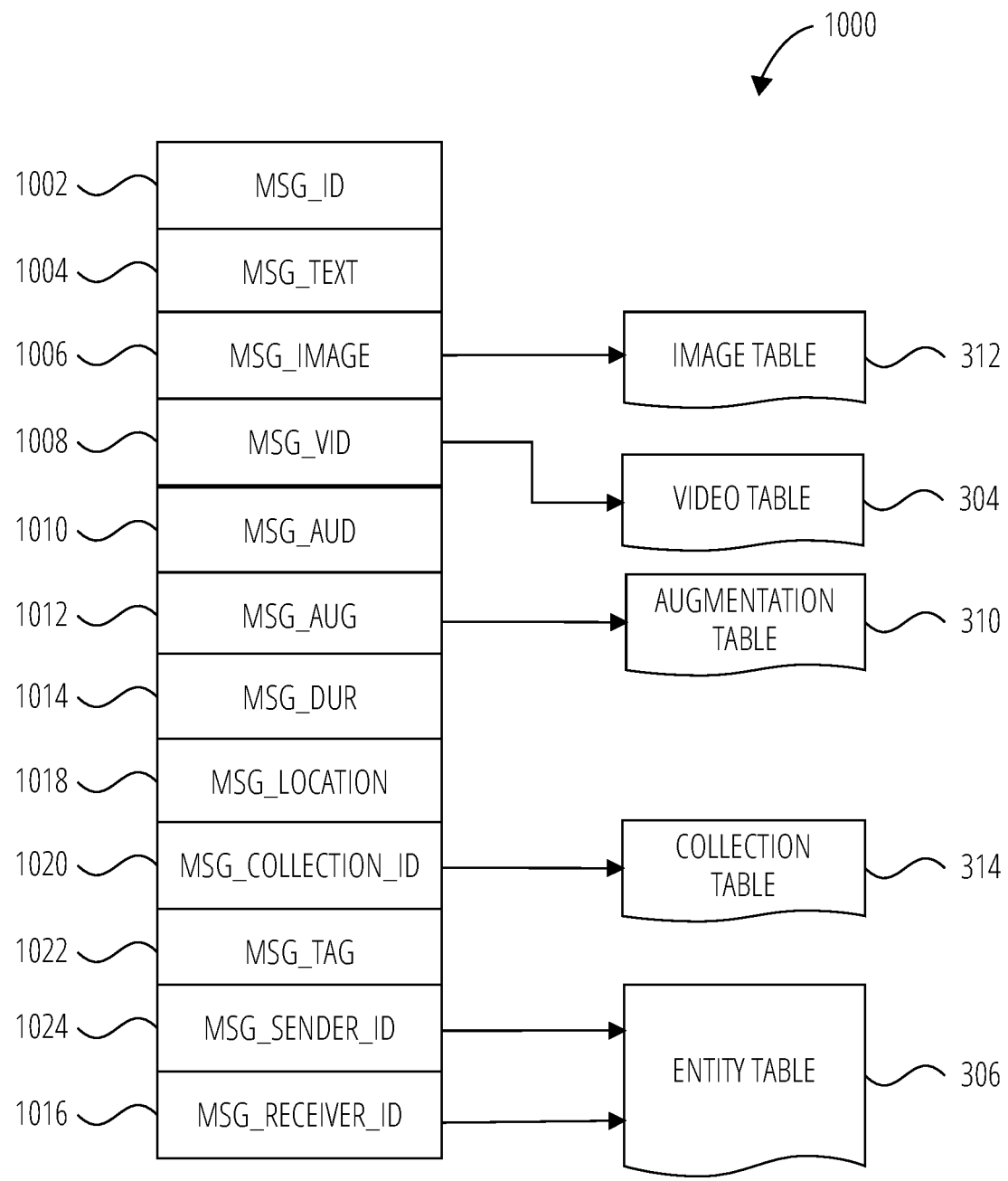
FIG. 10 is a diagrammatic representation of a message, according to some examples.

FIG. 10 is a schematic diagram illustrating a structure of a message 1000, according to some examples, generated by an interaction client 104 for communication to a further interaction client 104 via the interaction servers 118. The content of a particular message 1000 is used to populate the message table 302 stored within the database 318, accessible by the interaction servers 118. Similarly, the content of a message 1000 is stored in memory as "in-transit" or "in-flight" data of the user system 102 or the interaction servers 118. A message 1000 is shown to include the following example components:

Message identifier 1002: a unique identifier that identifies the message 1000.

Message text payload 1004: text, to be generated by a user via a user interface of the user system 102, and that is included in the message 1000.

Message image payload 1006: image data, captured by a camera component of a user system 102 or retrieved from a memory component of a user system 102, and that is included in the message 1000. Image data for a sent or received message 1000 may be stored in the image table 312.

Message video payload 1008: video data, captured by a camera component or retrieved from a memory component of the user system 102, and that is included in the message 1000. Video data for a sent or received message 1000 may be stored in the video table 304.

Message audio payload 1010: audio data, captured by a microphone or retrieved from a memory component of the user system 102, and that is included in the message 1000.

Message augmentation data 1012: augmentation data (e.g., filters, stickers, or other annotations or enhancements) that represents augmentations to be applied to message image payload 1006, message video payload 1008, or message audio payload 1010 of the message 1000. Augmentation data for a sent or received message 1000 may be stored in the augmentation table 310.

Message duration parameter 1014: parameter value indicating, in seconds (for example), the amount of time for which content of the message (e.g., the message image payload 1006, message video payload 1008, message audio payload 1010) is to be presented or made accessible to a user via the interaction client 104.

Message geolocation parameter 1018: geolocation data (e.g., latitudinal and longitudinal coordinates) associated with the content payload of the message. Multiple message geolocation parameter 1018 values may be included in the payload, each of these parameter values being associated with respect to content items included in the content (e.g., a specific image within the message image payload 1006, or a specific video in the message video payload 1008).

Message collection identifier 1020: identifier values identifying one or more content collections (e.g., "stories" identified in the collection table 314) with which a particular content item in the message image payload 1006 of the message 1000 is associated. For example, multiple images within the message image payload 1006 may each be associated with multiple content collections using identifier values.

Message tag 1022: each message 1000 may be tagged with multiple tags, each of which is indicative of the subject matter of content included in the message payload. For example, where a particular image included in the message image payload 1006 depicts an animal (e.g., a lion), a tag value may be included within the message tag 1022 that is indicative of the relevant animal. Tag values may be generated manually, based on user input, or may be automatically generated using, for example, image recognition.

Message sender identifier 1024: an identifier (e.g., a messaging system identifier, email address, or device identifier) indicative of a user of the user system 102 on which the message 1000 was generated and from which the message 1000 was sent.

Message receiver identifier 1016: an identifier (e.g., a messaging system identifier, email address, or device identifier) indicative of a user of the user system 102 to which the message 1000 is addressed.

The contents (e.g., values) of the various components of message 1000 may be pointers to locations in tables within which content data values are stored. For example, an image value in the message image payload 1006 may be a pointer to (or address of) a location within an image table 312. Similarly, values within the message video payload 1008 may point to data stored within a video table 304, values stored within the message augmentation data 1012 may point to data stored in an augmentation table 310, values stored within the message collection identifier 1020 may point to data stored in a collection table 314, and values stored within the message sender identifier 1024 and the message receiver identifier 1016 may point to user records stored within an entity table 306.

System with Head-Wearable Apparatus

Figure 11:
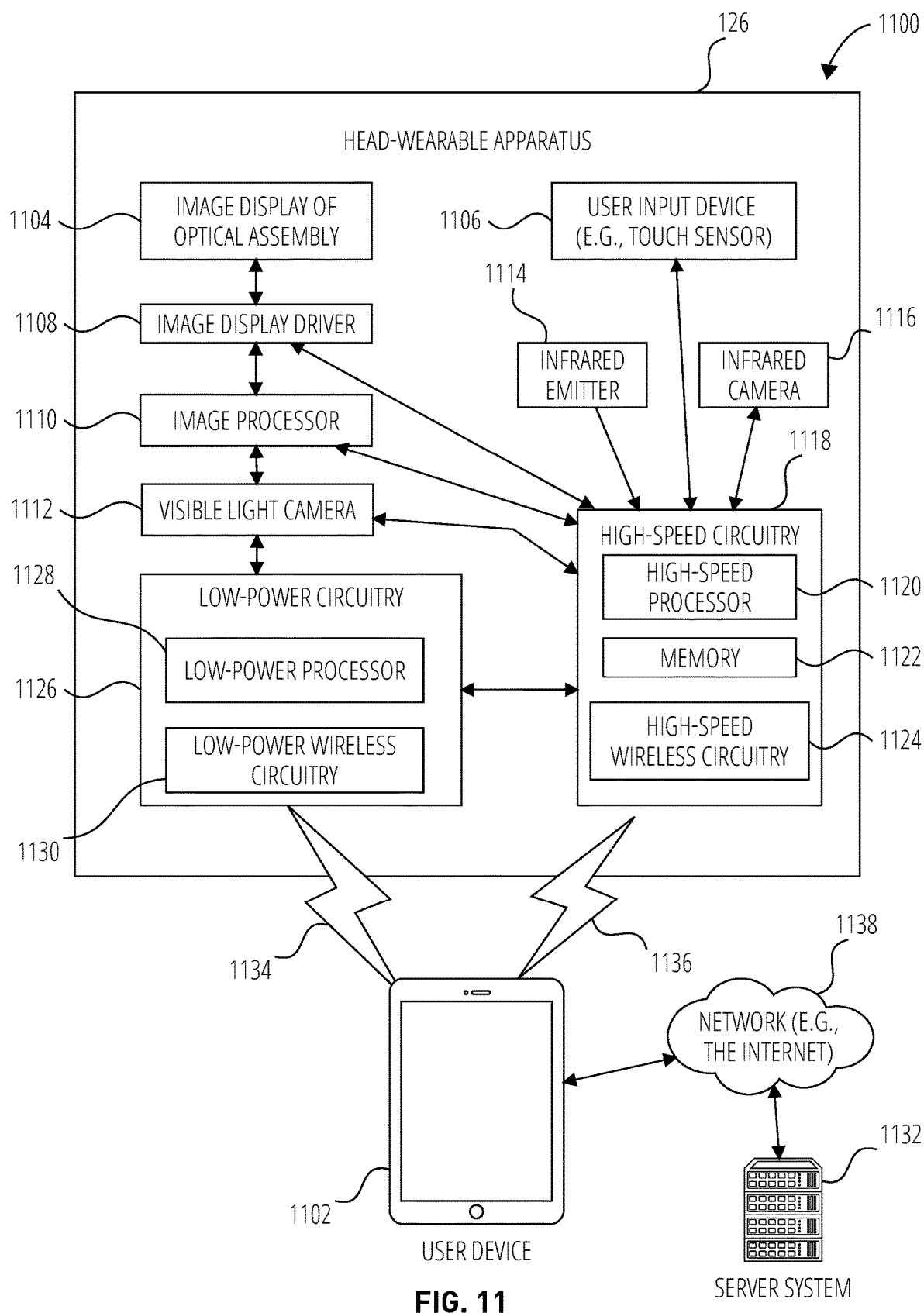
FIG. 11 illustrates a system that includes a head-wearable apparatus, according to some examples.

FIG. 11 illustrates a system 1100 including a head-wearable apparatus 126, according to some examples. FIG. 11 is a high-level functional block diagram of an example head-wearable apparatus 126 communicatively coupled to a mobile user device 1102 and a server system 1132 via a network 1138.

The head-wearable apparatus 126 includes one or more cameras, each of which may be, for example, a visible light camera 1112, an infrared emitter 1114, and an infrared camera 1116. The user device 1102 connects with head-wearable apparatus 126 using both a low-power wireless connection 1134 and/or a high-speed wireless connection 1136. The user device 1102 is also connected to the server system 1132 and the network 1138.

The head-wearable apparatus 126 further includes two image displays of the image display of optical assembly 1104. The two image displays of optical assembly 1104 include one associated with the left lateral side and one associated with the right lateral side of the head-wearable apparatus 126. The head-wearable apparatus 126 also includes an image display driver 1108, an image processor 1110, low-power circuitry 1126, and high-speed circuitry 1118. The image display of optical assembly 1104 is for presenting images and videos, including an image that can include a graphical user interface to a user of the head-wearable apparatus 126.

The image display driver 1108 commands and controls the image display of optical assembly 1104. The image display driver 1108 may deliver image data directly to the image display of optical assembly 1104 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 126 includes a frame and stems (or temples) extending from a lateral side of the frame. The head-wearable apparatus 126 further includes a user input device 1106 (e.g., touch sensor or push button) including an input surface on the head-wearable apparatus 126. The user input device 1106 (e.g., touch sensor or push button) is to receive from the user an input selection to manipulate the graphical user interface of the presented image.

The components shown in FIG. 11 for the head-wearable apparatus 126 are located on one or more circuit boards, for example a PCB or flexible PCB, in the rims or temples. Alternatively, or additionally, the depicted components can be located in the chunks, frames, hinges, or bridge of the head-wearable apparatus 126. Left and right visible light cameras 1112 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 126 includes a memory 1122, which stores instructions to perform a subset or all of the functions described herein. The memory 1122 can also include a storage device.

As shown in FIG. 11, the high-speed circuitry 1118 includes a high-speed processor 1120, a memory 1122, and high-speed wireless circuitry 1124. In some examples, the image display driver 1108 is coupled to the high-speed circuitry 1118 and operated by the high-speed processor 1120 in order to drive the left and right image displays of the image display of optical assembly 1104. The high-speed processor 1120 may be any processor capable of managing high-speed communications and operation of any general computing system needed for the head-wearable apparatus 126. The high-speed processor 1120 includes processing resources needed for managing high-speed data transfers on a high-speed wireless connection 1136 to a wireless local area network (WLAN) using the high-speed wireless circuitry 1124. In certain examples, the high-speed processor 1120 executes an operating system such as a LINUX operating system or other such operating system of the head-wearable apparatus 126, and the operating system is stored in the memory 1122 for execution. In addition to any other responsibilities, the high-speed processor 1120 executing a software architecture for the head-wearable apparatus 126 is used to manage data transfers with high-speed wireless circuitry 1124. In certain examples, the high-speed wireless circuitry 1124 is configured to implement Institute of Electrical and Electronic Engineers (IEEE) 802.11 communication standards, also referred to herein as Wi-Fi. In some examples, other high-speed communications standards may be implemented by the high-speed wireless circuitry 1124.

The low-power wireless circuitry 1130 and the high-speed wireless circuitry 1124 of the head-wearable apparatus 126 can include short-range transceivers (Bluetooth™) and wireless wide, local, or wide area network transceivers (e.g., cellular or Wi-Fi). User device 1102, including the transceivers communicating via the low-power wireless connection 1134 and the high-speed wireless connection 1136, may be implemented using details of the architecture of the head-wearable apparatus 126, as can other elements of the network 1138.

The memory 1122 includes any storage device capable of storing various data and applications, including, among other things, camera data generated by the left and right visible light cameras 1112, the infrared camera 1116, and the image processor 1110, as well as images generated for display by the image display driver 1108 on the image displays of the image display of optical assembly 1104. While the memory 1122 is shown as integrated with high-speed circuitry 1118, in some examples, the memory 1122 may be an independent standalone element of the head-wearable apparatus 126. In certain such examples, electrical routing lines may provide a connection through a chip that includes the high-speed processor 1120 from the image processor 1110 or the low-power processor 1128 to the memory 1122. In some examples, the high-speed processor 1120 may manage addressing of the memory 1122 such that the low-power processor 1128 will boot the high-speed processor 1120 any time that a read or write operation involving memory 1122 is needed.

As shown in FIG. 11, the low-power processor 1128 or high-speed processor 1120 of the head-wearable apparatus 126 can be coupled to the camera (visible light camera 1112, infrared emitter 1114, or infrared camera 1116), the image display driver 1108, the user input device 1106 (e.g., touch sensor or push button), and the memory 1122.

The head-wearable apparatus 126 is connected with a host computer. For example, the head-wearable apparatus 126 is paired with the user device 1102 via the high-speed wireless connection 1136 or connected to the server system 1132 via the network 1138. The server system 1132 may be one or more computing devices as part of a service or network computing system, for example, that includes a processor, a memory, and network communication interface to communicate over the network 1138 with the user device 1102 and the head-wearable apparatus 126.

The user device 1102 includes a processor and a network communication interface coupled to the processor. The network communication interface allows for communication over the network 1138, low-power wireless connection 1134, or high-speed wireless connection 1136. User device 1102 can further store at least portions of the instructions to implement the functionality described herein.

Output components of the head-wearable apparatus 126 include visual components, such as a display such as a liquid crystal display (LCD), a plasma display panel (PDP), a light-emitting diode (LED) display, a projector, or a waveguide. The image displays of the optical assembly are driven by the image display driver 1108. The output components of the head-wearable apparatus 126 further include acoustic components (e.g., speakers), haptic components (e.g., a vibratory motor), other signal generators, and so forth. The input components of the head-wearable apparatus 126, the user device 1102, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 126 may also include additional peripheral device elements. Such peripheral device elements may include biometric sensors, additional sensors, or display elements integrated with the head-wearable apparatus 126. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1134 and high-speed wireless connection 1136 from the user device 1102 via the low-power wireless circuitry 1130 or high-speed wireless circuitry 1124.

Any biometric collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Software Architecture

Figure 12:
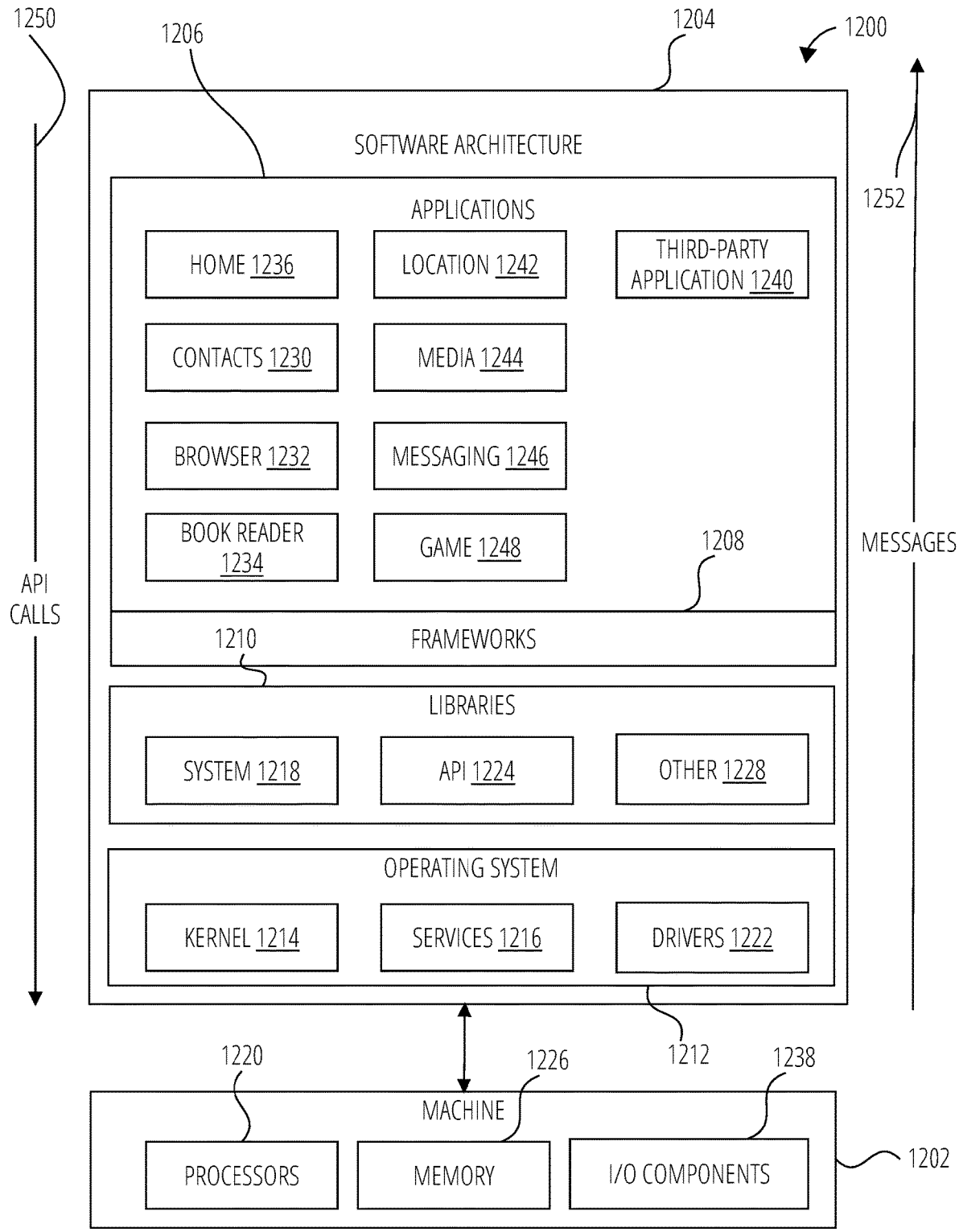
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, Bluetooth™ or Bluetooth™ Low Energy drivers, flash memory drivers, serial communication drivers (e.g., USB drivers), Wi-Fi drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS™ Phone, or another mobile operating system. In this example, the third-party application 1240 can invoke the API calls 1250 provided by the operating system 1212 to facilitate functionalities described herein.

Machine Architecture

Figure 13:
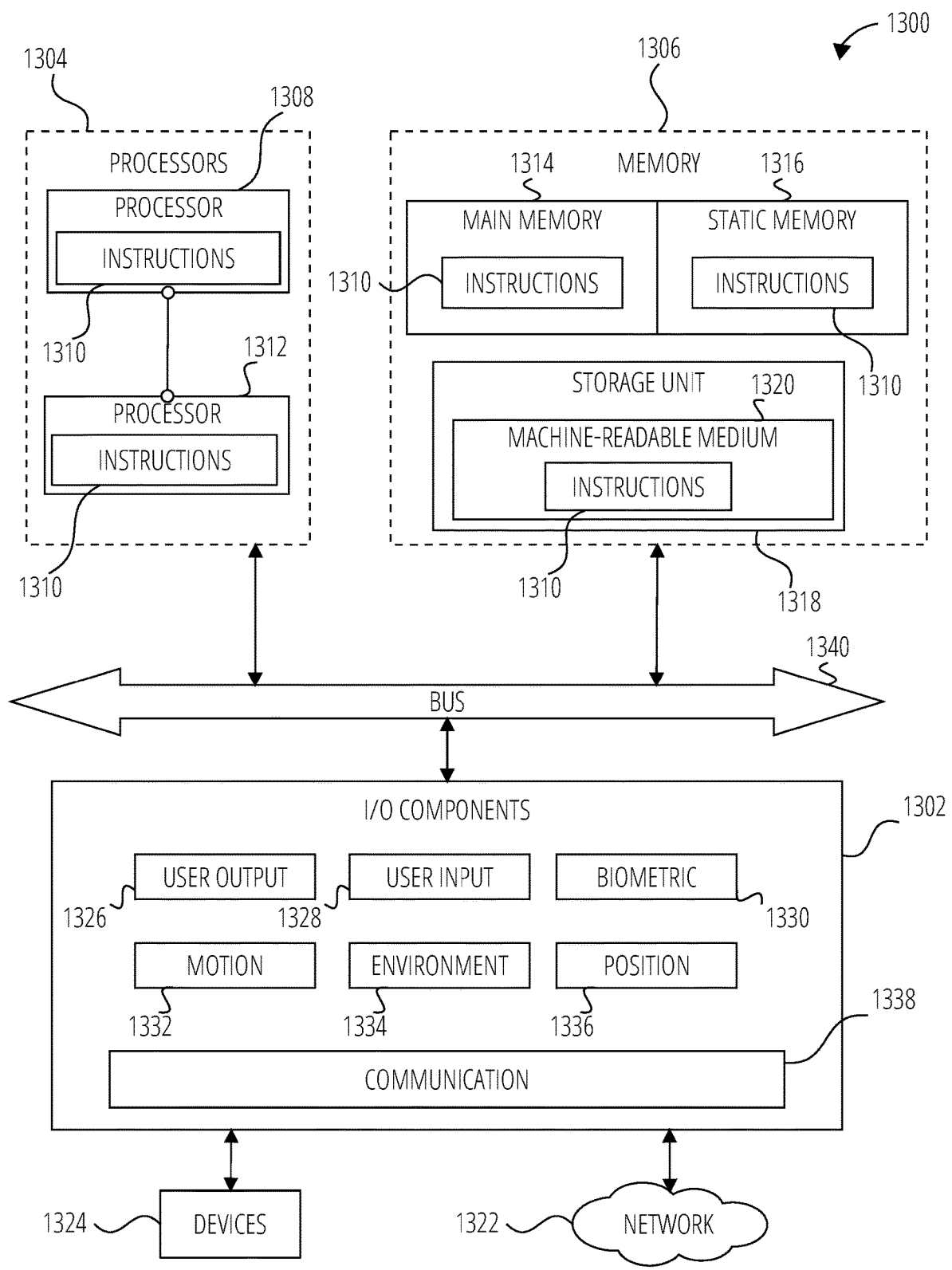
FIG. 13 is a diagrammatic representation of a machine in the form of a computer system within which a set of instructions may be executed for causing the machine to perform any one or more of the methodologies discussed herein, according to some examples.

FIG. 13 is a diagrammatic representation of a machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while a single machine 1300 is illustrated, the term "machine" shall also be taken to include a collection of machines that individually or jointly execute the instructions 1310 to perform any one or more of the methodologies discussed herein. The machine 1300, for example, may comprise the user system 102 or any one of multiple server devices forming part of the interaction server system 108. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1302, which may be configured to communicate with each other via a bus 1340. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1314, a static memory 1316, and a storage unit 1318, both accessible to the processors 1304 via the bus 1340. The main memory 1306, the static memory 1316, and storage unit 1318 store the instructions 1310 embodying any one or more of the methodologies or functions described herein. The instructions 1310 may also reside, completely or partially, within the main memory 1314, within the static memory 1316, within machine-readable medium 1320 within the storage unit 1318, within at least one of the processors 1304 (e.g., within the processor's cache memory), or any suitable combination thereof, during execution thereof by the machine 1300.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include user output components 1326 and user input components 1328. The user output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1302 may include biometric components 1330, motion components 1332, environmental components 1334, or position components 1336, among a wide array of other components. For example, the biometric components 1330 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1332 include acceleration sensor components (e.g., accelerometer), gravitation sensor components, rotation sensor components (e.g., gyroscope).

The environmental components 1334 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1336 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1338 operable to couple the machine 1300 to a network 1322 or devices 1324 via respective coupling or connections. For example, the communication components 1338 may include a network interface component or another suitable device to interface with the network 1322. In further examples, the communication components 1338 may include wired communication components, wireless communication components, cellular communication components, Near Field Communication (NFC) components, Bluetooth™ components (e.g., Bluetooth™ Low Energy), Wi-Fi components, and other communication components to provide communication via other modalities. The devices 1324 may be another machine or any of a wide variety of peripheral devices (e.g., a peripheral device coupled via a USB).

Moreover, the communication components 1338 may detect identifiers or include components operable to detect identifiers. For example, the communication components 1338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1338, such as location via Internet Protocol (IP) geolocation, location via Wi-Fi signal triangulation, location via detecting an NFC beacon signal that may indicate a particular location, and so forth.

The various memories (e.g., main memory 1314, static memory 1316, and memory of the processors 1304) and storage unit 1318 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1322, using a transmission medium, via a network interface device (e.g., a network interface component included in the communication components 1338) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1324.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method to present an affordance user interface element within a user interface of an interaction application, the method comprising: detecting an association of a supplemental media content item with a first primary media content item presented within the user interface of the interaction application; automatically identifying the supplemental media content item from among a plurality of supplemental media content items supported by the interaction application; automatically retrieving metadata related to the supplemental media content item; causing presentation, within the user interface of the interaction application, of a supplementation affordance that presents the metadata related to the supplemental media content item and that is user selectable via the user interface to invoke a supplementation function; detecting a user selection of the supplementation affordance within the user interface; and responsive to the detection of the user selection of the supplementation affordance: invoking the supplementation function, and causing presentation of the supplemental media content item for application by a user of the interaction application to a second primary media content item.

In Example 2, the subject matter of Example 1 includes, wherein causing presentation the supplementation affordance comprises causing presentation of the supplementation affordance together with the first primary media content item within the user interface.

In Example 3, the subject matter of Example 2 includes, wherein the supplementation affordance is a context card that is overlaid on the first primary media content item.

In Example 4, the subject matter of Examples 1-3 includes, detecting an association of a further supplemental media content item with the first primary media content item; automatically retrieving further metadata related to the further supplemental media content item; and causing presentation, within the user interface of the interaction application, of a further supplementation affordance that presents the further metadata related to the further supplemental media content item and that is user selectable via the user interface to invoke a further supplementation function.

In Example 5, the subject matter of Example 4 includes, wherein causing presentation of the further supplementation affordance comprises: automatically identifying that the supplemental media content item has a first context type and that the further supplemental media content item has a second context type; automatically determining a context priority based on the first context type and the second context type; and causing arrangement of the supplementation affordance relative to the further supplementation affordance within the user interface based on the context priority.

In Example 6, the subject matter of Examples 4-5 includes, detecting a user selection of the further supplementation affordance within the user interface; and responsive to the detection of the user selection of the further supplementation affordance: invoking the further supplementation function, and causing presentation of the further supplemental media content item for application by the user within the context of the interaction application.

In Example 7, the subject matter of Examples 4-6 includes, wherein causing presentation of the further supplementation affordance comprises causing presentation, within the user interface of the interaction application, of a context carousel that includes the supplementation affordance and the further supplementation affordance.

In Example 8, the subject matter of Example 7 includes, detecting insufficient user interface area for presentation of the supplementation affordance and the further supplementation affordance; and responsive to the detection of the insufficient user interface area, invoking an automatic scrolling function that causes movement of the supplementation affordance and the further supplementation affordance relative to the first primary media content item within the user interface.

In Example 9, the subject matter of Examples 1-8 includes, wherein the supplementation function enables user selection of the second primary media content item and automatic association of the supplemental media content item with the second primary media content item.

In Example 10, the subject matter of Example 9 includes, wherein invoking the supplementation function comprises automatically launching a camera function of the interaction application to enable the user to capture the second primary media content item, the supplemental media content item being automatically applied to the second primary media content item.

In Example 11, the subject matter of Examples 1-10 includes, wherein the metadata comprises an icon associated with the supplemental media content item.

In Example 12, the subject matter of Examples 1-11 includes, wherein the supplemental media content item is an augmentation that is applied to the first primary media content item.

In Example 13, the subject matter of Example 12 includes, wherein the first primary media content item comprises an image, and the augmentation is an image augmentation applied to the image.

In Example 14, the subject matter of Example 13 includes, wherein the metadata comprises at least one of a title of the image augmentation or an identification of a creator of the image augmentation.

In Example 15, the subject matter of Examples 1-14 includes, wherein the supplemental media content item is an audio file that is applied to the first primary media content item.

In Example 16, the subject matter of Example 15 includes, wherein the metadata comprises at least one of: a title of the audio file; an identification of a creator of the audio file; or an animated audio-representing user interface element.

In Example 17, the subject matter of Examples 1-16 includes, wherein the first primary media content item comprises at least one of image content or video content.

In Example 18, the subject matter of Examples 1-17 includes, wherein the second primary media content item comprises at least one of image content or video content.

Example 19 is a computing apparatus comprising: at least one processor; and a memory storing instructions that, when executed by the at least one processor, configure the computing apparatus to perform operations comprising: detecting an association of a supplemental media content item with a first primary media content item presented within a user interface of an interaction application; automatically identifying the supplemental media content item from among a plurality of supplemental media content items supported by the interaction application; automatically retrieving metadata related to the supplemental media content item; causing presentation, within the user interface of the interaction application, of a supplementation affordance that presents the metadata related to the supplemental media content item and that is user selectable via the user interface to invoke a supplementation function; detecting a user selection of the supplementation affordance within the user interface; and responsive to the detection of the user selection of the supplementation affordance: invoking the supplementation function, and causing presentation of the supplemental media content item for application by a user of the interaction application to a second primary media content item.

Example 20 is a non-transitory computer-readable storage medium, the computer-readable storage medium including instructions that when executed by at least one processor, cause the at least one processor to perform operations comprising: detecting an association of a supplemental media content item with a first primary media content item presented within a user interface of an interaction application; automatically identifying the supplemental media content item from among a plurality of supplemental media content items supported by the interaction application; automatically retrieving metadata related to the supplemental media content item; causing presentation, within the user interface of the interaction application, of a supplementation affordance that presents the metadata related to the supplemental media content item and that is user selectable via the user interface to invoke a supplementation function; detecting a user selection of the supplementation affordance within the user interface; and responsive to the detection of the user selection of the supplementation affordance: invoking the supplementation function, and causing presentation of the supplemental media content item for application by a user of the interaction application to a second primary media content item.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," or "user device," refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

What is claimed is:
1. A method comprising:
accessing metadata of a supplemental media content item associated with a first primary media content item presented within a user interface of an interaction application, the supplemental media content item comprising at least one of an image filter or an audio file, and the supplemental media content item being applied to the first primary media content item by a first user of the interaction application;
causing presentation, within the user interface of the interaction application, of one or more user interface elements providing a supplementation affordance and presenting the metadata of the supplemental media content item so as to identify the at least one of the image filter or the audio file applied to the first primary media content item by the first user;
detecting a user selection, made by a second user of the interaction application, of a user-selectable element of the one or more user interface elements within the user interface;
based on the user selection of the user-selectable element:
 causing presentation of the supplemental media content item for application to a second primary media content item; and
 launching a camera function of the interaction application to enable the second user to capture the second primary media content item, wherein the supplemental media content item is pre-selected within the user interface for application to the second primary media content item;
receiving a user selection, made by the second user, to capture the second primary media content item; and
in response to receiving the user selection to capture the second primary media content item, capturing the second primary media content item and automatically applying the supplemental media content item to the second primary media content item.

2. The method of claim 1, wherein causing presentation of the one or more user interface elements comprises causing presentation of the one or more user interface elements together with the first primary media content item within the user interface.

3. The method of claim 1, further comprising:
detecting a first association of the supplemental media content item with the first primary media content item;
detecting a second association of a further supplemental media content item with the first primary media content item;
accessing further metadata of the further supplemental media content item; and
causing presentation, within the user interface of the interaction application, of one or more further user interface elements providing a further supplementation affordance and presenting the further metadata of the further supplemental media content item.

4. The method of claim 3, wherein causing presentation of the one or more further user interface elements comprises:
automatically identifying that the supplemental media content item has a first context type and that the further supplemental media content item has a second context type;
automatically determining a context priority based on the first context type and the second context type; and
causing arrangement of the one or more user interface elements relative to the one or more further user interface elements within the user interface based on the context priority.

5. The method of claim 1, wherein the camera function of the interaction application is automatically launched in response to the detection of the user selection of the user-selectable element to enable the user of the interaction application to capture the second primary media content item.

6. The method of claim 1, wherein the camera function provides a real-time camera feed to enable the user to capture the second primary media content item.

7. The method of claim 1, wherein the metadata comprises an icon associated with the supplemental media content item.

8. The method of claim 1, wherein the supplemental media content item comprises the image filter, the first primary media content item comprises image data, and the image filter is applied to the image data.

9. The method of claim 1, wherein the supplemental media content item comprises the image filter, and the image filter is one of a plurality of image filters supported by the interaction application for application to media content items.

10. The method of claim 1, wherein the supplemental media content item comprises the image filter, and the metadata comprises at least one of a title of the image filter or an identification of a creator of the image filter.

11. The method of claim 1, wherein the supplemental media content item comprises the audio file that is applied to the first primary media content item.

12. The method of claim 11, wherein the audio file is one of a plurality of audio files supported by the interaction application for application to media content items.

13. The method of claim 11, wherein the metadata comprises at least one of a title of the audio file or an identification of a creator of the audio file.

14. The method of claim 1, wherein the first primary media content item comprises at least one of image content or video content.

15. The method of claim 1, wherein the second primary media content item comprises at least one of image content or video content.

16. A computing apparatus comprising:
at least one processor; and
a memory storing instructions that, when executed by the at least one processor, configure the computing apparatus to perform operations comprising:
accessing metadata of a supplemental media content item associated with a first primary media content item presented within a user interface of an interaction application, the supplemental media content item comprising at least one of an image filter or an audio file, and the supplemental media content item being applied to the first primary media content item by a first user of the interaction application;
causing presentation, within the user interface of the interaction application, of one or more user interface elements providing a supplementation affordance and presenting the metadata of the supplemental media content item so as to identify the at least one of the image filter or the audio file applied to the first primary media content item by the first user;
detecting a user selection, made by a second user of the interaction application, of a user-selectable element of the one or more user interface elements within the user interface;
based on the user selection of the user-selectable element:
causing presentation of the supplemental media content item for application to a second primary media content item; and
launching a camera function of the interaction application to enable the second user to capture the second primary media content item, wherein the supplemental media content item is pre-selected within the user interface for application to the second primary media content item;
receiving a user selection, made by the second user, to capture the second primary media content item; and
in response to receiving the user selection to capture the second primary media content item, capturing the second primary media content item and automatically applying the supplemental media content item to the second primary media content item.

17. A non-transitory computer-readable storage medium, the computer-readable storage medium including instructions that when executed by at least one processor, cause the at least one processor to perform operations comprising:
accessing metadata of a supplemental media content item associated with a first primary media content item presented within a user interface of an interaction application, the supplemental media content item comprising at least one of an image filter or an audio file, and the supplemental media content item being applied to the first primary media content item by a first user of the interaction application;
causing presentation, within the user interface of the interaction application, of one or more user interface elements providing a supplementation affordance and presenting the metadata of the supplemental media content item so as to identify the at least one of the image filter or the audio file applied to the first primary media content item by the first user;
detecting a user selection, made by a second user of the interaction application, of a user-selectable element of the one or more user interface elements within the user interface;
based on the user selection of the user-selectable element:
causing presentation of the supplemental media content item for application to a second primary media content item; and
launching a camera function of the interaction application to enable the second user to capture the second primary media content item, wherein the supplemental media content item is pre-selected within the user interface for application to the second primary media content item;
receiving a user selection, made by the second user, to capture the second primary media content item; and
in response to receiving the user selection to capture the second primary media content item, capturing the second primary media content item and automatically applying the supplemental media content item to the second primary media content item.

18. The computing apparatus of claim 16, wherein the camera function of the interaction application is automatically launched in response to the detection of the user selection of the user-selectable element to enable the user of the interaction application to capture the second primary media content item.

19. The computing apparatus of claim 16, wherein the camera function provides a real-time camera feed to enable the user to capture the second primary media content item.

20. The non-transitory computer-readable storage medium of claim 17, wherein the camera function provides a real-time camera feed to enable the user to capture the second primary media content item.

* * * * *